United States Patent
Zhang et al.

(10) Patent No.: US 11,466,180 B2
(45) Date of Patent: Oct. 11, 2022

(54) VULCANIZATION TIRE LABEL

(71) Applicant: Avery Dennison Corporation, Glendale, CA (US)

(72) Inventors: Jun Zhang, Shanghai (CN); Xinhui Zhou, Kunshan (CN); Yuanhua Zhu, Kunshan (CN); Yurun Yang, Shanghai (CN); Biao Shen, Shanghai (CN); Ke Zhao, Shanghai (CN)

(73) Assignee: Avery Dennison Corporation, Glendale, CA (US)

( * ) Notice: Subject to any disclaimer, the term of this patent is extended or adjusted under 35 U.S.C. 154(b) by 419 days.

(21) Appl. No.: 16/495,260

(22) PCT Filed: May 8, 2017

(86) PCT No.: PCT/CN2017/083493
§ 371 (c)(1),
(2) Date: Sep. 18, 2019

(87) PCT Pub. No.: WO2018/205107
PCT Pub. Date: Nov. 15, 2018

(65) Prior Publication Data
US 2021/0189195 A1 Jun. 24, 2021

(51) Int. Cl.
*B32B 7/00* (2019.01)
*B32B 3/10* (2006.01)
(Continued)

(52) U.S. Cl.
CPC ............... *C09J 7/50* (2018.01); *C09D 5/002* (2013.01); *C09D 7/61* (2018.01); *C09D 115/02* (2013.01);
(Continued)

(58) Field of Classification Search
CPC ...... G09F 3/10; G09F 3/02; G09F 2003/0201; C09J 2453/00; C09J 153/02
See application file for complete search history.

(56) References Cited

U.S. PATENT DOCUMENTS 4,098,935 A * 7/1978 Knudsen .............. G09F 3/0297
428/354
5,358,772 A 10/1994 Nakagawa et al.
(Continued)

FOREIGN PATENT DOCUMENTS

CN 1143885 10/2003
CN 1705568 12/2005
(Continued)

OTHER PUBLICATIONS

"Manufacturing Pressure-Sensitive Adhesive Products: A Coating and Laminating Process," ASI Adhesives & Sealants Industry, Apr. 1, 2005, www.adhesivesmag.com/articles/86079-manufacturing-pressure-sensitive-adhesive-products-a-coating-and-laminating-process.
(Continued)

*Primary Examiner* — Shin H Kim

(57) ABSTRACT

The present application relates to a vulcanization label that can be used to label tires. The label comprises a facestock layer, a first primer layer, a second primer layer comprising a zinc oxide, and a reactive adhesive layer. The two primer layers have different compositions. The second primer layer has a coating weight that is greater than 3 gsm. At least a portion of the second primer is in contact with at least a portion of the reactive adhesive layer.

50 Claims, 6 Drawing Sheets

(51) Int. Cl.
*C09J 7/50* (2018.01)
*C09D 7/61* (2018.01)
*C09D 5/00* (2006.01)
*C09D 115/02* (2006.01)
*C09J 109/06* (2006.01)
*C09J 153/02* (2006.01)
*G09F 3/02* (2006.01)
*G09F 3/10* (2006.01)
*G09F 23/00* (2006.01)
*C08K 3/22* (2006.01)

(52) U.S. Cl.
CPC ............ *C09J 109/06* (2013.01); *C09J 153/02* (2013.01); *G09F 3/02* (2013.01); *G09F 3/10* (2013.01); *G09F 23/00* (2013.01); *C08K 3/22* (2013.01); *C08K 2003/2241* (2013.01); *C08K 2003/2296* (2013.01); *C09J 2203/334* (2013.01); *C09J 2203/338* (2013.01); *C09J 2453/00* (2013.01); *G09F 2003/023* (2013.01)

(56) References Cited

U.S. PATENT DOCUMENTS

| | | |
|---|---|---|
| 5,700,623 A | 12/1997 | Anderson et al. |
| 5,709,918 A | 1/1998 | Kimijima et al. |
| 5,800,919 A | 9/1998 | Peacock et al. |
| 5,968,871 A | 10/1999 | Katashima et al. |
| 6,054,213 A | 4/2000 | Peacock et al. |
| 6,153,288 A | 11/2000 | Shih et al. |
| 6,310,133 B1 | 10/2001 | Katashima et al. |
| 6,358,605 B1* | 3/2002 | Casper ................ G09F 3/02 428/161 |
| 6,756,095 B2 | 6/2004 | Sandt et al. |
| 6,777,080 B2 | 8/2004 | Khandpur et al. |
| 6,822,029 B1 | 11/2004 | Burmeister et al. |
| 6,825,261 B2 | 11/2004 | Katashima et al. |
| 7,081,288 B2 | 7/2006 | Guo et al. |
| 7,094,732 B2 | 8/2006 | Finger |
| 7,163,728 B2 | 1/2007 | Finger |
| 7,181,878 B2 | 2/2007 | Tucker |
| 7,226,967 B2 | 6/2007 | Burmeister et al. |
| 7,560,512 B2 | 7/2009 | DuBois |
| 7,892,639 B2 | 2/2011 | Mess et al. |
| 7,902,298 B2 | 3/2011 | Kohlstrung et al. |
| 8,088,481 B2 | 1/2012 | Tabata |
| 8,629,209 B2 | 1/2014 | Lee et al. |
| 8,846,816 B2 | 9/2014 | Borkowsky et al. |
| 8,920,895 B2 | 12/2014 | Savagian et al. |
| 8,936,841 B2 | 1/2015 | Katarya et al. |
| 9,188,889 B2 | 11/2015 | Koger et al. |
| 9,199,771 B2 | 12/2015 | Kaser |
| 9,499,726 B2 | 11/2016 | Zmarsly et al. |
| 2004/0007322 A1 | 1/2004 | Lechat et al. |
| 2004/0126576 A1* | 7/2004 | Kinning ................ C09J 7/21 428/354 |
| 2006/0162846 A1 | 7/2006 | Roach et al. |
| 2006/0205877 A1 | 9/2006 | DuBois |
| 2007/0101625 A1 | 5/2007 | Tucker |
| 2008/0145611 A1 | 6/2008 | Mess |
| 2008/0145612 A1 | 6/2008 | Church et al. |
| 2009/0068389 A1 | 3/2009 | Maule et al. |
| 2009/0312483 A1 | 12/2009 | Kitson |
| 2010/0092716 A1 | 4/2010 | Spychalsky |
| 2011/0268897 A1 | 11/2011 | Klemann |
| 2015/0210042 A1* | 7/2015 | Tapio ................ B32B 27/302 156/60 |
| 2016/0018748 A1 | 1/2016 | Koger et al. |
| 2019/0359860 A1* | 11/2019 | Schubert ................ C08L 23/12 |
| 2021/0189195 A1* | 6/2021 | Zhang ................ C09D 5/002 |

FOREIGN PATENT DOCUMENTS

| | | |
|---|---|---|
| CN | 1705569 | 12/2005 |
| CN | 1268708 | 8/2006 |
| CN | 101198670 | 6/2008 |
| CN | 101410448 | 4/2009 |
| CN | 1989215 | 9/2010 |
| CN | 101133134 | 5/2011 |
| CN | 102083893 | 6/2011 |
| CN | 102245727 | 11/2011 |
| CN | 101583986 | 12/2011 |
| CN | 102592508 | 7/2012 |
| CN | 202650424 U | 1/2013 |
| CN | 102918575 | 2/2013 |
| CN | 202742786 U | 2/2013 |
| CN | 103237820 | 8/2013 |
| CN | 203299861 U | 11/2013 |
| CN | 203300135 U | 11/2013 |
| CN | 104112393 | 10/2014 |
| CN | 104981354 | 10/2015 |
| CN | 105431483 | 3/2016 |
| DE | 102014005855 | 10/2014 |
| EP | 2223814 | 9/2010 |
| EP | 3013897 | 3/2017 |
| JP | 2002-244561 | 8/2002 |
| WO | 2007/001743 | 1/2007 |
| WO | 2015/085590 | 6/2015 |
| WO | 2016/053933 | 4/2016 |
| WO | 2016/099945 | 6/2016 |
| WO | 2016/127056 | 8/2016 |

OTHER PUBLICATIONS

International Preliminary Report on Patentability dated Nov. 12, 2019 issued in corresponding IA No. PCT/CN2017/083493 filed May 8, 2017.

International Search Report and Written Opinion dated Jan. 3, 2018 issued in corresponding IA No. PCT/CN2017/083493 filed May 8, 2017.

* cited by examiner

VULCANIZATION TIRE LABEL

CROSS-REFERENCE TO RELATED APPLICATION

The present application is a 371 of International Application No. PCT/CN2017/083493, which was published in English on Nov. 15, 2018 and is incorporated herein by reference in its entirety.

FIELD OF THE INVENTION

The present application relates generally to labels, e.g., labels for use in the tire vulcanization process. The application also relates to methods of manufacturing the labels and the use of labels to label tires and other rubber-based articles.

BACKGROUND OF THE INVENTION

Tire manufacturers often need to track information about production date, date of original installation, and other data. This information is typically printed on the facestock of a label. This information is very critical for the manufacturer to validate the quality of tire throughout the whole life cycle. However, labeling tires and other rubber-based articles can be problematic as these surfaces are rough and typically unclean, which makes it difficult to adhere labels to the surfaces. These problems are particularly evident if the labeling occurs prior to fabrication or before production is complete.

U.S. Pat. No. 6,358,605 discloses a label for use on a rubber product. The label comprises a film substrate, a first primer layer comprising at least one of a resorcinol-formaldehyde or resorcinol-formaldehyde latex resin in contact with one surface of the film substrate, and a pressure sensitive adhesive in intimate contact with the surface of the resin, which is opposite the surface of the resin that is in contact with the film substrate. The label further comprises a second primer layer comprising chlororesorcinol, which is located between the film substrate and the first primer layer such that one surface of the second primer layer is in intimate contact with the film substrate and the other surface of the second primer layer is in intimate contact with the first primer layer. However, the adhesion strength of these labels to rubber products leaves much to be desired.

PCT Publication No. WO2016053933A1 discloses a tire tracking label that includes electronic identification provisions, e.g., radio frequency identification devices, incorporated in the label. The label comprises one or more RFID component, at least one face layer, optionally at least one primer layer, and at least one adhesive layer. The RFID component of the label is sandwiched between the adhesive layer and the liner, between the face layer and the primer layer, or between the primer layer and the adhesive layer. It also discloses that one of such primer is THIXON-P-11.

U.S. Pat. No. 4,098,935 discloses a tape for labeling vulcanizable rubber articles comprising a backing, an adhesion promoting primer, a thick layer of pressure sensitive adhesive, and a coating comprising a tough thermoset polymer over a magnetic recording layer. However, the two primer layers are separated by a central backing PET layer.

Even in view of these references, the need exists for adhesive labels that can be applied to green rubber-based articles such as tires and can endure the relatively high temperatures and pressures associated with vulcanization while providing superior adhesive properties.

SUMMARY OF THE INVENTION

In some embodiments, this disclosure provides a label comprising: a facestock layer, a first primer layer, a second primer layer comprising a zinc oxide, and a reactive adhesive layer, wherein the two primer layers have different compositions and wherein the second primer layers has a coating weight that is greater than 3 gsm, and wherein at least a portion of the second primer is in contact with at least a portion of the reactive adhesive layer.

In some embodiments, the first primer comprises at least one of carbon and a zinc oxide. In some embodiments, the reactive adhesive layer comprises: a first rubber comprising a styrene-isoprene-styrene ("SIS") copolymer; a second rubber comprising a styrene-butadiene ("SB") copolymer; a tackifier comprising a compound selected from a hydrocarbon resin, a rosin resin, and mixtures thereof; and a curing agent comprising a phenolic resin.

In some embodiments, the label comprises a facestock layer, a first primer layer; a second primer layer; and a reactive adhesive layer, which comprises first rubber comprising a styrene-isoprene-styrene ("SIS") copolymer, and a second rubber comprising a styrene-butadiene ("SB") copolymer, a tackifier comprising a compound selected from the group consisting of a hydrocarbon resin, a rosin resin, and mixtures thereof; and a curing agent comprising a phenolic resin.

In some embodiments, the two primer layers have different compositions and wherein at least one of the first and second primer layers has a coating weight that is greater than 3 gsm. In some embodiments, the first primer is in contact with at least a portion of the facestock layer. In some embodiments, the weight ratio of SIS to SB copolymers ranges from 4:1 to 0.25:1. In some embodiments, both the first and second primer layers comprise zinc oxide. In some embodiments, the first primer layer further comprises titanium dioxide. In some embodiments, the first primer layer and the second primer layer comprise carbon and zinc oxide, and the weight ratio of zinc oxide in the first primer to zinc oxide in the second primer ranges from 0.05:1 to 1:1. In some embodiments, the first primer layer is essentially free of epoxy resin. In some embodiments, the second primer layer is essentially free of titanium dioxide.

In some embodiments, the reactive adhesive layer is essentially free of zinc oxide. In some embodiments, the first primer layer comprises: titanium oxide, zinc oxide, phenolic resin, and chlorinated rubber.

In some embodiments, the first primer layer comprises: from 12 to 20 wt % titanium dioxide; from 4 to 10 wt % carbon, and from 2 to 8 wt % zinc oxide, based on the weight of the first primer layer. In some embodiments, the first primer layer comprises: from 4 to 40 wt % phenolic resin; and/or from 40 to 80 wt % chlorinated rubber, based on the weight of the first primer layer. In some embodiments, the second primer layer comprises zinc oxide, carbon, phenolic resin, chlorinated rubber, and bisphenol-A-epichlorthdrin epoxy resin.

In some embodiments, the second primer layer comprises: from 4 to 10 wt % carbon; from 4 to 12 wt % zinc oxide; and/or from 0.4 to 2 wt % epoxy resin based on the weight of the second primer layer. In some embodiments, the second primer layer comprises from 0.4 to 2 wt %, bisphenol-A epichlorhydrin epoxy resin based on the weight of the second primer layer. In some embodiments, the second primer layer comprises: from 4 to 40 wt % phenolic resin; and from 40 to 80 wt % chlorinated rubber based on the weight of the second primer layer. In some embodiments, the label of any of the preceding claims, wherein the epoxy resin has an average molecular weight that ranges from 100 to 700 g/mol.

In some embodiments, the facestock layer has a thickness ranging from 100 microns to 1000 microns. In some embodiments, the facestock layer is receptive to thermal transfer printing. In some embodiments, the facestock layer further comprises a topcoat. In some embodiments, the second primer layer has a coating weight ranging from 3 to 15 gsm. In some embodiments, the label of any of the preceding claims, where in the first primer layer has a coating weight ranging from 1-8 gsm. In some embodiments, the coating weight ratio of the first primer to the second primer ranges from 0.2:1 to 2:1.

In some embodiments, the label further comprises a liner. In some embodiments the liner has a thickness ranging from 20 to 150 micron. In some embodiments wherein the curing agent comprises a phenolic derivative and is essentially free of sulfur. In some embodiments, the phenolic derivative comprises bromized phenol formaldehyde. In some embodiments the amount of SIS copolymer ranges from 10 to 50% based on the total weight of the adhesive. In some embodiments the amount of SB copolymer ranges from 10 to 50% based on the total weight of the adhesive.

In some embodiments, the weight ratio of combined copolymers to tackifier ranges from 1:2 to 2:1. In some embodiments, the amount of rosin resin in the adhesive ranges from 0 to 50% based on the total weight of the adhesive. In some embodiments, the amount of hydrocarbon resin in the adhesive ranges from 0 to 50% based on the total weight of the adhesive. In some embodiments, the adhesive has a coating weight that ranges from 10 gsm-80 gsm. In some embodiments, the label demonstrates a 180° C. peel strength that ranges from 15 to 25 N/inch on stainless steel. In some embodiments, the label demonstrates a 180° C. peel strength that ranges from 3 to 10 N/inch on green rubber. In some embodiments, the label demonstrates a 180° C. peel strength that is greater than 50 N/inch on stainless steel after vulcanization at 160° C. for 10 min or vulcanization at 180° C. for 20 min. In some embodiments, the label demonstrates a 180° C. peel strength that is greater than 200 N/inch on green rubber after vulcanization at 160° C. for 10 min or vulcanization at 180° C. for 20 min.

In some embodiments, this disclosure provides a method of producing a label, and the method comprises a) providing a first primer solution comprising components dispersed in a first complex solvent, and a second primer solution comprising zinc oxide dispersed in a second complex solvent, wherein the first and second primer solution have different compositions, b) coating the first primer solution on a facestock layer to form a film/first primer complex, c) drying the first primer/film complex, d) coating the second primer solution on the first primer in the film/first primer complex to form a film/first primer/second primer complex, and e) drying the film/first primer/second primer complex. In some embodiments, the components in the first primer solution comprise titanium oxide, zinc oxide, phenolic resin, chlorinated rubber, and/or carbon. In some embodiments, the second primer solution further comprises phenolic resin, chlorinated rubber, epoxy resin and/or carbon. In some embodiments, step (b) and/or step (d) is performed by gravure coating.

In some embodiments, the first complex solvent is selected from the group consisting of xylene, methyl pentanone, and mixtures thereof. In some embodiments, the second complex solvent is selected from the group consisting of xylene, ethyl benzene, isopropy alcohol, and mixtures thereof. In some embodiments, the method comprises laminating the dried film/first primer/second primer complex with a reactive adhesive layer. In some embodiments, the adhesive layer is coated with on a liner before being laminated with the dried film/first primer/second primer complex.

In some embodiments, the method comprises attaching the label from any of the preceding claims to a tire. In some embodiments, the tire with the label attached is vulcanized at a temperature ranging from 150 to 200° C. for 10-20 min and under the pressure of at least 1 Mpa.

DETAILED DESCRIPTION OF THE INVENTION

Figure 1:
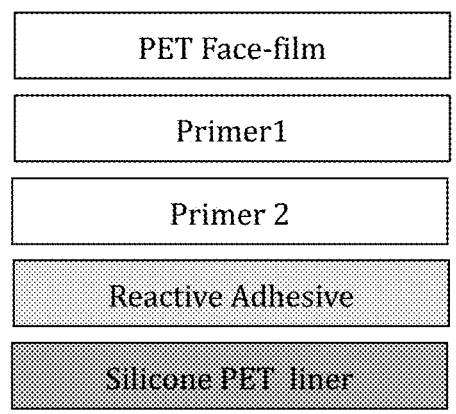
FIG. 1 illustrates an exemplary configuration of the vulcanization label as described herein.
Figure 2:
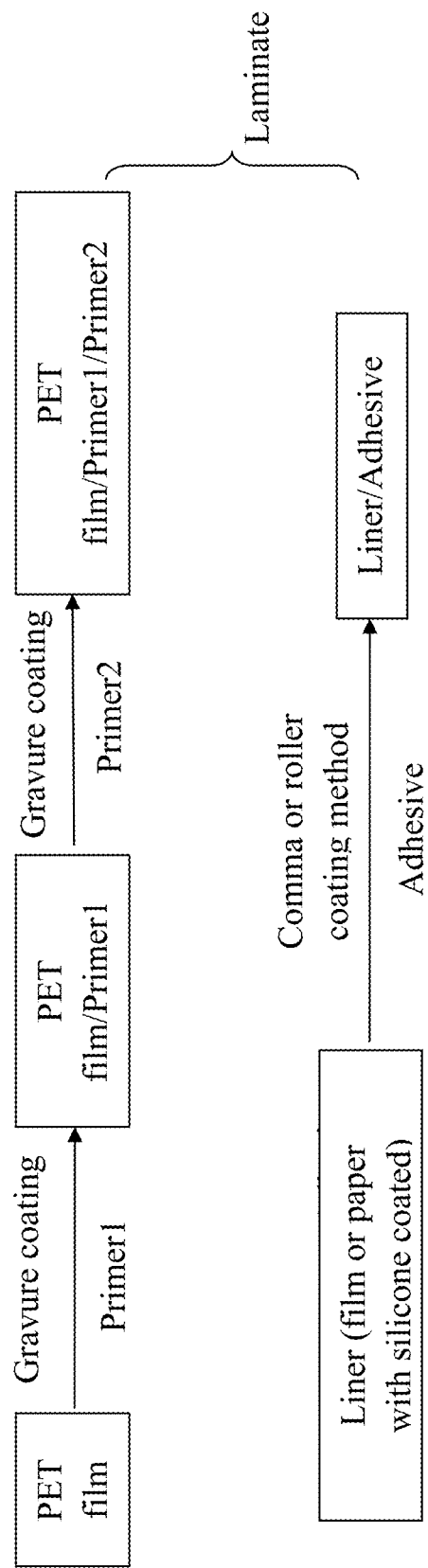
FIG. 2 illustrates that a process of producing the vulcanization label as described herein.

The present disclosure relates to labels, e.g., tracking labels for tires, that can withstand pressures and temperatures associated with a wide variety of vulcanization processes while providing superior adhesive properties. Also disclosed are tires and other rubber-based articles that have the tracking labels attached thereto as well as methods of producing the labels. Furthermore, the present disclosure relates to methods of identifying and/or tracking one or more tires or other rubber-based articles having the labels.

The inventors have found that a specific configuration of primer, adhesive, and facestock layers, one or more of which have particular combination of components, provides for highly desirable combinations of performance characteristics, e.g., excellent durability and chemical resistance and the ability to be cured under broad conditions. Advantageously, the labels demonstrate the ability to act as a pressure sensitive adhesive (PSA) label while being attached to tires before vulcanization. At this point, the labels have properties of a PSA, such as good adhesion, reposition, and removability. After being exposed to high temperature and high pressure during the tire vulcanization process, the PSA labels beneficially vulcanize with a green rubber substrate and become structurally bonded to the cured rubber, e.g., the labels become permanently affixed to the cured rubber. To achieve these unique performance characteristics, the labels utilize a configuration that comprises at least two primer layers along with a reactive adhesive layer. The primer layers are different from one another. For example, each may have a unique, different composition, or each may utilize a different coating weight. This configuration provides excellent anchorage between the facestock layer and the reactive adhesive layer before and after the vulcanization process. The reactive adhesive layer, which comprises an adhesive comprising reactive components, facilitates a crosslinking reaction during vulcanization. Importantly, (at least a portion of the) second primer is in contact with (at least a portion of) the reactive adhesive layer. The primer layers may also comprise reactive components, which work synergistically with the reactive adhesive. Preferably, the coating weight of the second primer layer is greater than 3 gsm. In this configuration, the primer layers work to crosslink during vulcanization and strengthen the bond between the facestock layer and the adhesive, while the reactive adhesive layer bonds the label to the substrate, e.g., the rubber-based article. For purpose of the disclosure, green rubber refers to natural rubber or rubber-based article that has not been vulcanized.

As noted above, some conventional labels for tracking rubber articles are known. Many of these labels, however, lack the desired mechanical performance, stability, and durability. Unlike the labels disclosed in this application, many conventional labels do not comprise a reactive component and/or multiple distinct primer layers, e.g., primer layers comprising zinc oxide. As a result, these labels are not expected to adhere very well to the rubber product. Other conventional labels may comprise a single primer layer, e.g., THIXON-P-11, but do not utilize configurations, e.g., primer layers in direct contact with one another, of different primers to provide the aforementioned beneficial combination of performance capabilities. Some other labels, for example, those described in U.S. Pat. Nos. 6,358,605 and 4,098,935, comprise only natural or synthetic rubber based adhesive, which are not reactive, i.e., the adhesive would not become structurally bonded to rubber upon vulcanization. In addition, these labels often uses only a single primer layer and do not possess the improved adhesion properties that result from using two different primer layers as described below. Therefore, these labels in general adhere poorly to rubber, especially after being vulcanized with the rubber under high temperatures and high pressures that are required for producing mature rubber.

The labels disclosed in this application comprise a facestock layer, a first primer layer, a second primer layer, and a reactive adhesive layer. Importantly, the first primer layer and the second primer layer differ from one another, e.g., the primer layers have different compositions, coating weights, and/or thicknesses. In some embodiments, the first primer layer may comprise at least one of a carbon and a zinc oxide. The second primer layer may comprise, among other components, a zinc oxide, as long as the second primer layer differs from the first primer layer. The second primer layer is in contact with the reactive adhesive layer.

In some embodiments, e.g., as shown in FIG. 1, the labels comprise multiple layers, including and the layers mentioned above as well as a liner. It is also contemplated that the labels may include more layers of each type. For example, the label may comprise more than one facestock layer, more than one reactive adhesive layer, more than first and second primer layers, and/or more than one liner. The label may comprise additional primer layers, e.g., disposed between the facestock layer and the reactive adhesive layer. The layers are described in further detail below.

In some embodiments, the layers each have opposing top and bottom surfaces, the bottom surface being the surface facing an object or substrate to be labeled and the top surface being the surface on the opposite side of the bottom surface. In one embodiment, the bottom of the facestock layer is in contact with the top surface of the first primer and the bottom surface of the first primer is in contact with the top surface of the second primer.

Primer Layer

The vulcanization labels comprise at least a first primer layer and a second primer layer. The first primer layer may be the primer layer that is the closest to the facestock layer and the second primer layer may be the primer layer closest to the reactive adhesive layer. The first primer layer and the second primer layer each may have a top surface and a bottom surface. In some embodiments, the top surface of the first primer layer is in contact with the bottom surface of the facestock layer; the bottom surface of the second primer layer is in contact with the top surface of the reactive adhesive layer; and the bottom surface of the first primer layer is in contact with the top surface of the second primer layer. The labels, in some cases, may comprise additional layers between the first primer layer and the second primer layer.

The inventors have discovered that while the first primer and the second primer may share some common components, such as the reactive components, to maximize the adhesion strength between the label and the rubber after vulcanization it is preferable that these two primers have different compositions. As one example of differences between the first and second primer layers, the layer may have different amounts of zinc oxide and/or different amounts of epoxy resin, and/or different coating weights. The inventors have discovered labels having differing first and second primer layers show greater adhesion strength (between various layers) than labels having two identical primer layers. The inventors also discovered that when the second primer layer has a specific coating weight, e.g., greater than 3 gsm, surprising improvements in adhesion performance are achieved, In preferred embodiments, the first and/or second primer layers comprise a reactive component, which becomes crosslinked during vulcanization. Beneficially, the crosslinking of the first primer may contribute to the bonding between the first primer and the facestock layer and the crosslinking of the second primer may contribute to the bonding between the second primer and/or the with the facestock layer. The second primer may crosslink with the reactive adhesive layer thus ultimately increasing the bonding of the facestock layer to the reactive adhesive layer. In some embodiments, the crosslinking degree of the second primer is higher than the crosslinking degree of crosslinking of the first primer after vulcanization. This improvement in overall bonding strength cannot be achieved utilizing one primer layer or multiple identical primer layers.

In preferred embodiments, the reactive components are selected from the group consisting of phenolic resin, chlorinated rubber, and mixtures thereof.

In some embodiments, the first primer layer comprises the reactive component in a total amount that ranges from 4 to 99 wt % based on the total weight of the first primer layer, e.g., from 30 to 95 wt %, from 40 to 90 wt %, from 50 to 85 wt %, or from 60 to 80 wt %. In terms of upper limits, the total amount of the reactive component may be present in an amount less than 99 wt %, e.g., less than 98 wt %, less than 95 wt %, less than 90 wt %, less than 85 wt %, or less than 80 wt %. In terms of lower limits, the total amount of reactive component may be present in an amount greater than 4 wt %, e.g., greater than 20 wt %, greater than 30 wt %, greater than 40 wt %, or greater than 50 wt %.

Preferably, the reactive component in the first primer layer comprises phenolic resin and/or chlorinated rubber. In cases where phenolic resin is employed, the amount of the phenolic resin in the first primer layer may range from 4 to 40 wt % based on the total weight of the first primer layer, e.g., from 5 to 35 wt %, from 10 to 30 wt %, from 25 wt % to 35 wt %, or from 20 to 40 wt %. In terms of upper limits, the amount of phenolic resin may be present in the primer layer(s) in an amount less than 40 wt %, less than 35 wt %, or less than 30 wt %. In terms of lower limits, the phenolic resin may be present in the primer layer(s) in an amount greater than 4 wt %, greater than 6 wt %, greater than 10 wt %, or greater than 15 wt %.

In some embodiments, the second primer layer comprises the reactive component in a total amount that ranges from 4 to 99 wt % based on the total weight of the second primer layer, e.g., from 30 to 95 wt %, from 40 to 90 wt %, from 50 to 85 wt %, or from 60 to 80 wt %. In terms of upper limits, the total amount of the reactive component may be present in an amount less than 99 wt %, e.g., less than 98 wt %, less than 95 wt %, less than 90 wt %, less than 85 wt %, or less than 80 wt %. In terms of lower limits, the total amount of reactive component may be present in an amount greater than 4 wt %, e.g., greater than 20 wt %, greater than 30 wt %, greater than 40 wt %, or greater than 50 wt %.

Preferably, the reactive component in the second primer layer also comprises phenolic resin and/or chlorinated rubber. In cases where phenolic resin is employed, the amount of the phenolic resin in the second primer layer may range from 4 to 40 wt % based on the total weight of the first primer layer, e.g., from 5 to 35 wt %, from 10 to 30 wt %, from 25 wt % to 35 wt %, or from 20 to 40 wt %. In terms of upper limits, the amount of phenolic resin may be present in the primer layer(s) in an amount less than 40 wt %, less than 35 wt %, or less than 30 wt %. In terms of lower limits, the phenolic resin may be present in the primer layer(s) in an amount greater than 4 wt %, greater than 6 wt %, greater than 10 wt %, or greater than 15 wt %.

In embodiments where chlorinated rubber is utilized, the chlorinated rubber in the respective primer layer(s) may be present in an amount ranging from 40 to 80 wt %, e.g., from 50 to 75 wt %, from 45 to 60 wt %, or from 55 to 75 wt %. In terms of upper limits, the chlorinated rubber may be present in the primer layer(s) in an amount less than 80 wt %, e.g., less than 75 wt %, less than 70 wt %, or less than 60 wt %. In terms of lower limits, the chlorinated rubber may be present in the primer layer(s) in an amount greater than 40 wt %, e.g., greater than 45 wt %, or greater than 55 wt %. For purpose of this disclosure, unless expressly stated to the contrary, the weight percentages are the percentage of a part based on the dry weight of the whole. For example, a statement that "chlorinated rubber is present in an amount ranging from 40 to 80 wt % based on the total weight of the first primer" refers to the weight percentage of chlorinated rubber is 40 to 80% based on the total dry weight of the first primer.

The inventors have surprisingly discovered that including titanium dioxide in the first primer layer (in certain weight percentages) can advantageously impart optimal stiffness to the primer, which is important for the pre-vulcanization adhesion, reposition, and removability properties. In some embodiments, the titanium dioxide may be present in the first primer later in an amount that ranges from 12 to 20 wt % based on the weight of the first primer layer, e.g., from 13 to 19 wt %, from 14 to 18 wt %, or from 15 to 17 wt %. In some cases the first primer layer comprises titanium dioxide in an amount about 14 wt %, about 15 wt %, about 16 wt %, about 17 wt %, about 18 wt %, or about 19 wt %. In terms of upper limits titanium oxide may be present in the first primer layer in an amount less than 20 wt %, e.g., less than 19 wt %, less than 18 wt %, or less than 17 wt %. In terms of lower limits, titanium oxide may be present in the first primer layer in an amount greater than 12 wt %, e.g., greater than 13 wt %, or greater than 14 wt %, The first primer layer may (further) comprise zinc oxide, which may beneficially serve as an accelerator for the crosslinking reaction. In some cases, the zinc oxide is present in the first primer layer in an amount ranging from 2 to 8 wt % based on total weight of the first primer layer, e.g., from 3 to 7 wt %, from 4 to 8 wt %, or from 5 to 7 wt %. In terms of upper limits, the zinc oxide may be present in an amount of less than 8 wt %, e.g., less than 7 wt %, or less than 6 wt %. In terms of lower limits, the zinc oxide may be present in an amount of greater than 2 wt %, e.g., greater than 3 wt %, or greater than 4 wt %. In one embodiment, the first primer layer comprises carbon black in an amount ranging from 4 to 10 wt %.

It has been found that using an epoxy resin in particular amounts in the second primer layer surprisingly improves the anchorage of the adhesive and the facestock layer. Without being bound by theory, it is believed that this increase in anchorage is due to the crosslinking of the epoxy resin to the second primer components (to some extent even before vulcanization), which may increase the bonding strength between the reactive adhesive layer and the primer layer. Optionally, epoxy resin is present in the second primer layer in an amount ranging from 0.4 to 2 wt % based on the weight of the second primer in the label, e.g., from 0.5 to 1 wt %, from 1 to 2 wt %, or from 0.7 to 1.5 wt %. In terms of upper limits, the epoxy resin may be present in the second primer layer in an amount less than 2 wt %, e.g., less than 1.6 wt %, less than 1.5 wt %. In terms of lower limits, the epoxy resin may be present in the second primer layer in an amount greater than 0.5 wt %, e.g., greater than 0.6 wt %, greater than 0.8 wt % or greater than 1.0 wt %. In some cases, the epoxy resin is bisphenol-A-(epichlorhydrin) epoxy resin.

The epoxy resin in the second primer layer may have a molecular weight ranging from 100 to 700 g/mol e.g., from 200 to 600 g/mol, 400 to 650 g/mol, 500 to 700 g/mol. In terms of upper limits, the epoxy resin in the second layer may have a molecular weight that is less than 700 g/mol, e.g., less than 650 g/mol, less than 500 g/mol. In terms of lower limits, the epoxy resin in the second layer may have a molecular weight that is greater than 100 g/mol, e.g., greater than 200 g/mol, greater than 300 g/mol, or greater than 400 g/mol.

The second primer layer may further comprise zinc oxide, which may beneficially serve as an accelerator for the crosslinking reaction. In some cases, the zinc oxide is present in the second primer layer in an amount ranging from 4 to 12 wt % based on total weight of the second primer layer, e.g., from 5 to 10 wt %, from 6 to 11 wt %, or from 8 to 12 wt %. In terms of upper limits, the zinc oxide is present in an amount less than 12 wt %, e.g., less than 11 wt %, or less than 10 wt %. In terms of lower limits, the zinc oxide is present in an amount greater than 4 wt %, e.g., greater than 5 wt %, or greater than 8 wt % based on the total weight of the second primer. The zinc oxide content in the second primer layer may be different, e.g., greater than, the zinc oxide content in the first primer layer. In certain embodiments, having greater zinc oxide in the second primer layer can accelerate the crosslinking reaction thus contribute to greater bonding strength between the second primer and the adhesive. The presence of zinc oxide in the second primer layer in amounts as described above is especially beneficial for labels having a reactive adhesive layer that is essentially free of zinc oxide. A label having a reactive adhesive layer that is essentially free of zinc oxide is desirable in some cases because the label is more stable as compared to a label that, but for the inclusion of zinc oxide in the reactive adhesive layer, has otherwise the same compositions.

It is also believed that maintaining the weight ratio of the zinc oxide in the first primer layer to the zinc oxide in the second primer within certain ranges can advantageously impart the desired adhesion strength after vulcanization. In preferred embodiments, the second primer comprises a higher concentration of zinc oxide than the first primer does. In some cases, zinc oxide in the second primer layer is at least 30% higher than the zinc oxide in the first primer layer, e.g., at least 50%, at least 100%, at least 300%, at least 500%, at least 1000% higher. The weight ratio of the zinc oxide in the first primer to the zinc oxide in the second primer may range from 0.05:1 to 1:1, e.g., from 0.07:1 to 0.25:1, from 0.1:1 to 0.5:1, from 0.2:1 to 1:1, or from 0.2:1 to 0.3:0.5. In terms of upper limits, the weight ratio of the zinc oxide in the first primer layer to that in the second primer layer may be less than 1:1, e.g., less than 0.3:0.5, or less than 0.5:1. In terms of lower limits, the weight ratio of the zinc oxide in the first primer layer to that in the second primer layer may be greater than 0.05:1, e.g., greater than 0.07:1, greater than 0.2:1, or greater than 0.25:1

In some embodiments, the first primer layer is essentially free of the epoxy resin (while the second primer comprises an epoxy resin as described above).

In one embodiment, the second primer layer may comprise little, if any titanium dioxide. In some cases, the second primer layer comprises less than 0.5 wt % titanium dioxide, e.g., less than 0.2 wt %, or less than 0.1 wt %. In some embodiments, the second primer is essentially free of titanium dioxide, e.g., free of titanium dioxide.

In general, thickness of any layer of the label is directly correlated with the coating weight of the layer. The thickness and coating weights of the layers may vary. The inventors have discovered that surprisingly keeping the coating weight ratio of the first primer to a second primer within certain ranges advantageously imparts greater adhesion strength to the rubber after being vulcanization. It is also surprisingly discovered that in many cases having a second primer layer having a coating weight or thickness greater than that of the first primer layer produces superior results in terms of the label's adhesion strength. It is believed, for example, that if the first primer is too thick or has a coating weight that is too high, the label will lack the flexibility needed for labeling purposes. It is also believed that if the second primer is too thin or has a coating weight that is too low, the label would lack sufficient durability.

Accordingly, the first primer according to the invention may have a coating weight ranging from 1 to 8 gsm, e.g., 2 to 6 gsm, 3 to 7 gsm, 4 to 8 gsm, or 2 to 4 gsm. In terms of upper limits, the first prime may have a coating weight that is less than 8 gsm, e.g., less than 7 gsm, less than 6 gsm, or less than 5 gsm. In terms of lower limits, the first primer layer may have a coating weight that is greater than 1 gsm, e.g., greater than 1.5 gsm, greater than 2 gsm, or greater than 2.5 gsm. In one embodiment, the first primer has a coating weight of about 2 gsm.

The second primer layer may have a coating weight ranging from 3 to 15 gsm, e.g., 5 to 15 gsm, 6 to 8 gsm, 5 to 9 gsm, 6 to 10 gsm, or 5 to 12 gsm. In terms of upper ranges, the second primer layer may have a coating weight of less than 15 gsm, e.g., less than 12 gsm, or less than 10 gsm. In terms of lower ranges, the second primer layer may have a coating weight of greater than 3 gsm, e.g., greater than 4 gsm, greater than 5 gsm, or greater than 6 gsm. In one embodiment, the second primer layer has a coating weight of about 7 gsm.

It is believed that keeping the coating weight or thickness ratio of the first primer layer to the second primer layer within certain ranges can impart the desired adhesion strength after vulcanization. In some embodiments, the coating weight ratio or the thickness ratio of the first primer layer to the second primer layer ranges from 0.2:1 to 2:1, e.g., from 0.2:1 to 1.8:1, from 1:4 to 1.8:1, from 0.38:1 to 1:1, or from 0.33:1 to 0.75:1. In some embodiments, the second primer layer has a coating weight or thickness that is equal to or greater than that of the first primer layer. In terms of upper ranges, the coating weight ratio or the thickness ratio of the first primer layer to the second primer layer is less than 2:1, e.g., less than 1.5:1, or less than 1:1. In terms of lower ranges, the coating weight ratio or the thickness ratio of the first primer layer to the second primer layer is greater than 0.2:1, e.g., greater than 0.25:1, or greater than 0.5:1. In some cases, as shown in Table 4, labels having coating weight ratios of the first primer to second primer of 0.63:1, e.g., 0.34:1, 1.86:1, or 0.74:1 demonstrate excellent adhesion strength with the rubber after being vulcanized.

In some embodiments, a first primer solution is first formed by mixing in one or more proper solvents various components disclosed above, e.g., titanium dioxide, carbon black, phenolic resin, chlorinated rubber, and/or zinc oxide. The second primer solution is also formed by mixing carbon black, epoxy resin, phenolic resin, chlorinated rubber, and/or zinc oxide in proper solvents. The mixing can occur at a temperature that is below 50° C., e.g., between 20° C. and 40° C., or between 20° C. and 30° C., or below the temperature that triggers vulcanization.

The solid content of the primer solution may vary, depending on the coating process employed. Primer solutions of this disclosure may in some embodiments have a solid content that ranges from 10 wt % to 75 wt %, e.g., from 15 wt % to 70 wt %, from 20 wt % to 60 wt %, from 25 wt % to 50 wt %, or from 30 wt % to 55 wt % based on the total weight of the primer solution. In terms of lower limits, the solid content of primer solution is greater than 10 wt %, e.g., greater than 15 wt %, greater than 20 wt %. In terms of upper limits, the solid content of the primer solution is less than 70 wt %, e.g., less than 65 wt %, less than 60 wt %, less than 55 wt %, or less than 50 wt %. In one embodiment the solid content of the primer solution is about 42 wt %.

Solvents that are suitable for dissolving the components of the first and/or second primers include, but are not limited to, xylene, ethyl benzene, 4-methyl-2-pentanone, aromatic solvents, ketones, aliphatic solvents and ester solvents. Such solvents may include ketones of from 3 to 15 carbon atoms (e.g., methyl ethyl ketone or methyl isobutyl ketone), alkylene glycols and/or alkylene glycol alkyl ethers having from 3 to 20 carbon atoms, acetates and their derivatives, ethylene carbonate, and a mixture thereof. Suitable alcohol solvents include mono-alcohols, such as methyl, ethyl, propyl, butyl alcohols, as well as cyclic alcohols such as cyclohexanol. In one embodiment, the solvents are a mixture of xylene and ethyl benzene. In another embodiment, the solvent is xylene, ethyl benzene, and 4-methyl-2-pentanone. In certain embodiments, a portion of the solvent system may include water. In other embodiments, however, the solvent system may be devoid of water.

The amount of solvent(s) used for producing the first or second primer layer may vary depending on the desired viscosity that is suitable for coating on other layers. Typically the solvent is present in the primer solution in an amount ranging from 50 wt % to 90 wt %, e.g., from 30 wt % to 65 wt %, from 40 wt % to 90 wt %, from 50 wt % to 80 wt %, e.g., about 75 wt %. In terms of lower limits, the solvent is present in an amount of greater than 30 wt %, e.g., greater than 40 wt %, greater than 50 wt %, or greater than 55 wt %, greater than 60 wt %, or about 58 wt %, based on the total weight of the primer solution. In terms of upper limits, the solvent is present in an amount of less than 75 wt %, e.g., less than 70 wt %, or less than 65 wt %, based on the total weight of the primer solution.

In certain embodiments, the first primer can be prepared by mixing titanium dioxide, carbon black, phenolic resin, chlorinated rubber, and zinc oxide in a solvent comprising 4-methyl-2-pentanone, xylene, and ethyl benzene. Exemplary component amounts are shown in Table 1:

TABLE 1

Exemplary First Primer Layer Components

| No. | Ingredient | Weight percentage based on the weight of the first primer solution | Weight percentage based on the weight of the first primer layer |
|---|---|---|---|
| 1 | 4-methyl-2-pentanone | 50-90 | — |
| 2 | Xylene | 5-15 | — |
| 3 | Titanium Dioxide | 3-5 | 12-20 |
| 4 | Carbon black | 1-2.5 | 4-10 |
| 5 | Ethyl benzene | 0.5-3 | — |
| 6 | Phenolic resin | 1-10 | 4-40 |
| 7 | Chlorinated rubber | 10-20 | 40-80 |
| 8 | Zinc Oxide | 0.5-2 | 2-8 |

In certain embodiments, the second primer can be prepared by mixing carbon black, phenolic resin, chlorinated rubber, zinc oxide, titanium dioxide, carbon black, phenolic resin, chlorinated rubber, and zinc oxide, bisphenol-A-(epichlorhydrin) epoxy resin in a solvent comprising xylene and ethyl benzene in certain amounts according to Table 2:

TABLE 2

Exemplary Second Primer Layer Components

| No. | Ingredient | Weight percentage based on the weight of the second primer solution | Weight percentage based on the weight of the second primer layer |
|---|---|---|---|
| 1 | Xylene | 50-90 | — |
| 2 | Carbon black | 1-2.5 | 4-10 |
| 3 | Ethyl benzene | 5-20 | — |
| 4 | Phenolic resin | 1-10 | 4-40 |
| 5 | Chlorinated rubber | 10-20 | 40-80 |
| 6 | Zinc Oxide | 1-3 | 4-12 |
| 7 | Bisphenol- A- (epichlorhydrin) epoxy resin, (number average molecular weight ≤700 | 0.1-0.5 | 0.4-2 |

Exemplary commercial first primer layers include, but are not limited to THIXON™ P-11-EF, available from Rohm and Hass, such as MEGUM 3276, MEGUM 3351, THXION P-6-EF, and THXION-7-5H.

Exemplary commercial second primer layers include, but are not limited to THIXON™ 520-P-EF (available from Rohm and Hass) MEGUM 128, MEGUM 122J, MEGUM 538, MEGUM 5382, THXION OSN-2-EF-V, and THXION 547-EF.

Reactive Adhesive Layer

The vulcanization label comprises an reactive adhesive ("PSA"), which may comprise a first rubber comprising a styrene-isoprene-styrene ("SIS") copolymer, a second rubber comprising a styrene-butadiene ("SB") copolymer, tackifier comprising hydrocarbon resin and/or rosin resin and a curing agent comprising a phenolic resin. The weight ratio of SIS to SB copolymers ranges from 4:1 to 0.25:1. In some cases, the reactive adhesive layer has a coating weight that ranges from 10 gsm to 80 gsm, e.g., from 15 gsm to 70 gsm, from 20 gsm to 60 gsm, from 30 gsm to 55 gsm, from 40 gsm to 75 gsm. In terms of upper limits, the reactive adhesive layer has a coating weight that is less than 80 gsm, e.g., less than 75 gsm, or less than 60 gsm. In terms of lower limits, the reactive adhesive layer has a coating weight that is greater than 10 gsm, e.g., greater than 15 gsm, greater than 20 gsm, or greater than 30 gsm.

The inventors have now discovered that the combination of a first rubber comprising an styrene-isoprene-styrene ("SIS") copolymer and a second rubber comprising a styrene-butadiene ("SB") copolymer, particularly at a weight ratio ranging from 4:1 to 0.25:1, specific tackifiers, e.g., hydrocarbon and rosin resins, and a sulfur free phenolic derivative curing agent in specific proportions surprisingly yields a high performance reactive adhesive. Without being bound by theory, it is believed that the (at least) two specific rubbers, at a specific weight ratio, react with the particular curing agent such that it achieves viscoelastic property that is optimal for PSA application. The combination of SIS copolymer and SB copolymer in proportional amounts imparts desired viscoelastic property which is helpful to PSA application. The resultant reactive adhesive can be easily applied, e.g., in a manner that is suitable for applying solvent borne PSA, to any facestock to produce a label, and the label so produced has excellent adhesion performance, removability and repositionability. Unlike a typical hotmelt, when the reactive adhesive/label are heated to or above a threshold ("triggering temperature"), the curing agent present in the PSA crosslinks the base copolymers and permanently adheres the label to the substrate. The cured reactive adhesive becomes a structural adhesive. As a result, the cured label exhibits superior mechanical properties such as superior strong static shear, storage modulus, and peel strength.

The inventors have also found that the use of phenolic derivatives at an amount within certain ranges as curing agents unexpectedly provide for a higher triggering temperature as compared to other type of curing agent. As compared to conventional PSAs containing curing agent, where the reactive adhesive is crosslinked during the coating process, which is typically performed at a temperature of 110° C. or less, the special formulation of the reactive adhesive disclosed in this application allows a formation of stable reactive adhesive -facestock laminate while the reactive adhesive remains substantially uncrosslinked. Only when the reactive adhesive is exposed at a high temperature that is typical for normal vulcanization condition (160-200° C.), the curing reaction will be triggered. Thus, the higher triggering temperature ensures the stability of the reactive adhesive, i.e, the adhesive curing reaction may occur during vulcanization, and will not occur during the compounding or coating process or in storage.

Further, in forming the label, the use of the specific components in the reactive adhesive advantageously provides for a coated adhesive in which the copolymers do not (substantially) crosslink upon application to the facestock, i.e., the copolymers remain substantially uncrosslinked. This benefit is important because it allows the crosslinking to occur at a later point, e.g., when the label is applied to a desired substrate, and the crosslinking occurs between the label and the substrate, which provides for a superior bond to the substrate. In conventional products, the crosslinking occurs during application to the facestock, which has little or no effect on the strength of the bond of the label to the desired substrate. It will be appreciated by those skilled in the art that the term "substantially uncrosslinked" is used herein to refer to relatively lowly crosslinked copolymers, e.g., the status of SIS and SB copolymer before the curing reaction. For example, substantially uncrosslinked copolymers may refer to a copolymer resin, in which less than less than 5 wt %, less than 3 wt %, or less than 2 wt % of the copolymers are crosslinked. For purpose of this disclosure, the term "crosslinked" refers to the status of the SIS and SB copolymers after the curing reaction is initiated, in which at least 15 wt %, at least 18 wt %, or at least 20 wt %, or at least 24 wt %, at least 30 wt %, or at least 40 wt %, or at least 41.3 wt % of the copolymers are crosslinked.

Polymer/Copolymer

The (co)polymers of the reactive adhesive" comprise a styrene-isoprene-styrene copolymer (SIS block copolymer) and a styrene-butadiene copolymer (SB block copolymer), where "S" denotes a polymerized segment or "block" of styrene monomers, "I" denotes a polymerized segment or "block" of isoprene monomers, and "B" denotes a polymerized segment or "block" of butadiene monomers.

The inventors have found that the unique proportional combination of SIS and SB copolymers in the reactive adhesive layer contributes to balanced properties of mechanical performance, such as peel and static shear. The unique proportional combination of the copolymers and the curing agent contributes to curing properties and thus the reactivity. For example, the SIS copolymer in the adhesive beneficially can be easily tackified and can contribute excellent adhesion performance to the adhesive.

The molecular weight of the SIS may also impact the adhesion performance. It is postulated that the higher molecular weight and/or the higher the styrene content surprisingly improves adhesion performance it would possess. In one embodiment, the molecular weight of the SIS copolymer ranges from 7,000-400,000 g/mole, e.g., from 70,000-300,000 g/mole, or from 100,000-300,000 g/mole. In terms of upper limits, the SIS copolymer can have a molecular weight less than 400000 g/mole, e.g., less than 300000 g/mole, less than 100000 g/mole. In terms of lower limits, the SB copolymer can have a molecular weight greater than 7000 g/mole, greater than 8000 g/mole, greater than 10000 g/mole, or greater than 20000 g/mole.

It is believed that styrene, when present in amounts within certain ranges, can impart the reactive adhesive layer with optimal pre-cure peel and static shear strength. Increasing the styrene content can enhance the tensile strength post-cure, but too much styrene will sacrifice the pressure sensitive properties for the pre-cure reactive adhesive layer, wherein the reactive adhesive layer remains substantially uncrosslinked. In one embodiment, the SIS copolymer has a styrene content ranged from 10 wt % to 50 wt %, e.g., from 15 wt % to 30 wt %, from 20 wt % to 30 wt %, from 16 wt % to 25 wt %, or from 18 wt % to 20 wt %, based on the weight of the SIS copolymer. In terms of upper limits, the styrene content in the SIS copolymer can be less than 30 wt %, e.g., less than 26 wt %, or less than 25 wt %. In terms of lower limits, the styrene content in the SIS copolymer can be greater than 8 wt %, e.g., greater than 10 wt %, or greater than 16 wt %.

The SB copolymer used in this invention typically has a molecular weight ranging from 7000 g/mole to 400000 g/mole, e.g., from 70000 g/mole to 300000 g/mole, or from 100,000 g/mole to 300,000 g/mole. In terms of upper limits, the SB copolymer can have a molecular weight less than 400,000 g/mole, e.g., less than 300,000 g/mole, less than 100,000 g/mole. In terms of lower limits, the SB copolymer can have a molecular weight greater than 7000 g/mole, greater than 8,000 g/mole, greater than 10,000 g/mole, or greater than 20,000 g/mole.

In some embodiments, the styrene content of the SB copolymer can range from 10 wt % to 50 wt %, from 15 wt % to 30 wt %. e.g., from 20 wt % to 30 wt %, from 16 wt % to 25 wt %, or from 18 wt %-20 wt % based on the weight of the SB copolymer. In terms of upper limits, the styrene content of the SB copolymer can be less than 35 wt %, e.g., less than 30 wt %, less than 25 wt %, or less than 20 wt %. In terms of lower limits, the styrene content of the SB copolymer may be greater than 5 wt %, e.g., greater than 10 wt %, greater than 15 wt %, or greater than 17 wt %.

In some embodiments, the weight ratio of SIS tri-block copolymer to SB di-block copolymer may range from 4:1 to 0.25:1, e.g., from 4:1 to 0.33:1, from 3:1 to 0.67:1, or about 1.5:1. In some embodiments, the SIS copolymer content can range from 10 wt % to 50 wt %, 18 wt % to 40 wt % based on the total weight of the adhesive, e.g., from 20 wt % to 35 wt %, from 25 wt % to 35 wt %, from 20 wt % to 25 wt %, from 35 wt % to 40 wt %, or from 22 wt % to 35 wt %, e.g., about 22.6 wt %. In terms of upper limits, the SIS copolymer content can be less than 50 wt %, less than 40 wt %, e.g., less than 38 wt %, less than 37 wt %, less than 36 wt %, less than 35 wt %, less than 32 wt %, less than 31 wt %, less than 29 wt %, less than 28 wt %, less than 27 wt %, or less than 25 wt %. In terms of lower limits, the SIS copolymer content can be at least 5 wt %, at least 10 wt %, at least 15 wt %, at least 20 wt %, at least 25 wt %, at least 30 wt %, or at least 35 wt %.

In some embodiments, the SB copolymer content can range from 10 wt % to 50 wt %, 10 wt % to 25 wt %, from 5 wt % to 30 wt %, from 10 wt % to 25 wt %, from 15 wt % to 20 wt %, from 12 wt % to 18 wt %, from 13 wt % to 20 wt %, or about 15.2 wt %. In terms of upper limits, the SB copolymer can be less than 40 wt %, e.g., less than 35 wt %, less than 50 wt %, less than 45 wt %, less than 40 wt %, less than 35 wt %, less than 30 wt %, less than 25 wt %, less than 20 wt %, less than 18 wt %, less than 17 wt %. In terms of lower limits, the SB copolymer content can be greater than 5 wt %, greater than 8 wt %, greater than 10 wt %, greater than 12 wt %, greater than 13 wt %, greater than 14 wt %, greater than 15 wt %.

Tackifier

The reactive adhesive layer of the invention comprises a tackifier. The tackifier may have a particular compatibility with the base copolymers SIS and SB, e.g., a synergistic combination that contributes to the tack and adhesion properties of the adhesive. The inventors has discovered that, hydrocarbon resin and/or rosin resin, optionally when used at certain weight ratios, offer an advantageous balance of adhesive properties and provide for adhesion improvements between SIS and SB copolymers.

Hydrocarbon resins are often thermoplastic resins that promote adhesion and tack in pressure sensitive adhesives. Hydrocarbon tackifiers are made from petroleum based feedstocks such as aliphatic hydrocarbon resin having five carbon atoms (C5), aromatic hydrocarbon resin having nine carbon atoms (C9), dicyclopentadiene (DCPD), Wingtack 10 (a C5 hybrocarbon resin), C6100 (a mixture of C5 and C9 hydrocarbon resin), or mixtures thereof. Hydrocarbon resins have been found to demonstrate good solubility and compatibility with the base copolymer. Hydrocarbon resins also provide the benefit of allowing the adhesive to work well on low surface energy substrate.

In some embodiments, the hydrocarbon resin in the adhesive is selected from the group consisting of aliphatic hydrocarbon having 5 carbon atoms, aromatic hydrocarbon having 9 carbon atoms, dicyclopentadiene, and mixtures thereof. In some embodiments, the rosin resin is selected from the group consisting of glycerol ester, pentaerythritol ester, and mixtures thereof. In some embodiments, the curing agent is a mixture of alkyl phenol formaldehyde and bromized alkyl phenol formaldehyde. In some embodiments, the amount of curing agent ranges from 1 to 15 wt % based on the total weight of the adhesive. In some embodiments, the curing agent has a methylol content that ranges from 7 wt % to 13 wt % based on the weight of the curing agent. In some embodiments, the SIS and the SB copolymers of the adhesive are crosslinked to a degree of between 10% and 45% after the adhesive is cured at 170° C. for 10 min.

In some embodiments, the amount of hydrocarbon resin in the adhesives ranges from 0 wt % to 50 wt %, based on the total weight of the adhesive, e.g., 2% to 45%, 5 wt % to 40 wt % from 10 wt % to 30 wt %, e.g., from 20 wt % to 40 wt %, e.g., about 39 wt %. In terms of upper limits, the amount of hydrocarbon resin in the adhesive can be less than 45 wt %, e.g., less than 40 wt %, less than 35 wt %, less than 30 wt %, based on the total weight of the adhesive. In terms of lower limits, the amount of hydrocarbon resin in the adhesive is greater than 10 wt %, e.g., greater than 15 wt %, greater than 20 wt %, greater than 30 wt %, based on the total weight of the adhesive.

Suitable commercial hydrocarbon resins include T-500 or TD-110 from Rayton, Piccotac 1095 or Piccotac 1100 from EASTMAN.

Rosin resins are the thermoplastic ester resins produced by reacting rosin acid with alcohol. They are typically derived from either aged tree stumps (wood rosin), sap (gum rosin), or by-products of the paper making process (tall oil rosin) and they impart excellent, aggressive adhesion to all polymer types. Non-limiting examples of rosin include glycerol ester and pentaerythritol esters.

The inventors have found that the presence of rosin resin in the reactive adhesive layer contributes to the stability and longevity properties of the adhesive, however excessive amount of rosin resin increases the chance of damaging the hard domains comprising the styrene groups in the SIS or SB copolymer and thus reducing the shear strength of reactive adhesive layer. In preferred embodiments, the rosin resin is present in an amount ranging from 0 wt % to 50 wt % based on the total weight of the adhesive, e.g., from 1 wt % to 45 wt %, from 5 wt % to 40 wt %, from 10 wt % to 25 wt %, from 10 wt % to 20 wt %, e.g., about 17 wt %. In terms of upper limits, the amount of rosin may be less than 40 wt %, less than 25 wt %, or less than 20 wt %. In terms of lower limits, the amount of rosin may be greater than 5 wt %, e.g., greater than 10 wt %, greater than 15 wt %, or greater than 16 wt % based on the total weight of the adhesive.

Suitable commercial rosin resins include GA100F, GB75 GA90 GA85, or GB100 from ARAKAWA.

The inventors of the application have discovered that combining hydrocarbon and rosin tackifiers at ratios within a particular range provides for desired stability, longevity, and adhesion performance. In some embodiments, the weight ratio of the hydrocarbon resin to rosin resin ranges from 1:0 to 0:1, e.g., from 1:0 to 0.25:1, from 5:1 to 0.2:1, from 3:1 to 0.33:1, between 1:1 to 3:1, or between 2:1 and 0.5:1, e.g., about 2.3:1. In terms of upper limits, the weight ratio of hydrocarbon resin to rosin resin is less than 1:0, e.g., less than 5:1, less than 4:1, less than 3:1, or less than 2.5:1. In terms of lower limits, the weight ratio of hydrocarbon resin to rosin resin is greater than 0:1, e.g., greater than 0.2:1, greater than 0.25:1, or greater than 0.33:1.

The amount of total tackifier present in the reactive adhesive layer may range from 10 wt % to 75 wt %, e.g., from 40 wt %-75 wt %, from 20 wt % to 70 wt %, from 40 wt % to 65 wt %, e.g., about 56.2 wt %, based on the total weight of the adhesive. In terms of upper limits, the amount of total tackifier may be less than 80 wt %, less than 75 wt %, less than 70 wt %. In terms of lower limits, the amount of total tackifier may be greater than 20 wt %, e.g., greater than 30 wt %, greater than 40 wt %, or greater than 45 wt %, based on the total weight of the adhesive.

In some embodiments, the weight ratio of tackifiers to base copolymers, e.g., SIS and SB copolymers, ranges from 0.11:1 to 4:1, e.g., from 1:5 to 4:1, from 0.33:1 to 3.5:1, from 0.5:1 to 3:1, or from 1:1 to 3:1. In terms of upper limits, the weight ratio of tackifiers to base copolymers is less than 4:1, e.g., less than 3:1, or less than 2:1. In terms of lower limits, the weight ratio of tackifiers to base copolymers is at least 0.11:1, e.g., at least 0.16:1, at least 0.25:1, or at least 0.33:1.

Curing Agent

The reactive adhesive layer comprises a curing agent comprising phenolic resin. The phenolic resin can comprise one or more phenolic derivatives. Phenolic resins have been found to have good chemical resistance and adhesion to substrates and when properly formulated phenolic resins can retain properties at elevated temperatures. In preferred embodiments, the curing agent used in the reactive adhesive layer comprises bromized alkyl phenol formaldehyde. In some embodiments, the curing agent comprises a mixture of alkyl phenol formaldehyde and bromized alkyl phenol formaldehyde.

In some embodiments, the curing agent is essentially free of sulfur. Using sulfur-free curing agent has been found to be surprisingly beneficial because it avoids the contamination problem caused by using sulfur based phenolic derivatives. In some embodiments, the curing agent comprises bromized phenol formaldehyde.

In preferred embodiments, the curing agent used in the reactive adhesive layer comprises methylol groups. The amount of methylol groups in the curing agent is directly correlated with the level of crosslinking density. A high methylol content however may cause it harder to solidify. The inventors of the application discovered surprisingly methylol group content within a defined range offers the optimum crosslinking densities and impart the desired adhesion and mechanical performance. For example, the methylol content in the curing agent used in the disclosed reactive adhesive layer may range from 5 wt % to 18 wt %, e.g., from 7 wt % to 15 wt %, 7 wt % to 13 wt %, from 10 wt %-13 wt %, from 8 wt % to 12 wt %, from 9 wt % to 13 wt %, or from 9 wt % to 11 wt %, based on the total weight of the curing agent in the reactive adhesive layer. In terms of upper limits, the methylol content in the curing agent used in the disclosed reactive adhesive layer is less than 15 wt %, e.g., less than 13 wt %. In terms of lower limits, the methylol content in the curing agent used in the disclosed reactive adhesive layer is greater than 7 wt %, e.g., greater than 8 wt %, or greater than 9 wt %. In a particular embodiment, the phenolic resin used as the curing agent is SP1056.

In one embodiment, the amount of curing agent in the reactive adhesive layer ranges from 0.8 wt % to 16.0 wt % based on the total weight of the reactive adhesive layer, e.g., from 1.0 wt % to 15 wt %, from 2.5 wt % to 8.0 wt %, from 3.5 wt % to 8.0 wt %, from 4 wt % to 7.0 wt %, from 5 wt % to 10.0 wt %, or from 4.5 wt % to 7.0 wt %, e.g., about 5.7 wt %. In terms of upper limits, the amount of curing agent is no greater than 20.0 wt %, e.g., no greater than 18.0 wt %, no greater than 15.0 wt %, or no greater than 10.0 wt %. In terms of lower limits, the amount of curing agent is no less than 0.8 wt %, e.g., no less than 1.0 wt %, no less than 1.3 wt %, or no less than 1.5 wt %.

The curing agent disclosed herein can cure the base copolymers under broad conditions. The HRP-PSA having the curing agent disclosed herein typically becomes reactive when the temperature is above a threshold of temperature, commonly referred to as triggering temperature. In practice, curing occurs after the reactive adhesive layer is assembled into a label with other layers and the resulted layer is attached to a substrate, for example, a tire. In some embodiments, the triggering temperature for curing ranges from 135° C. to 200° C., e.g., from 150° C. to 200° C., from 160° C. to 180° C., from 145° C. to 175° C., or from 155° C. to 185° C. In terms of upper limits, the triggering temperature can be less than 200° C., e.g., less than 185° C., less than 180° C. In terms of lower limits, the triggering temperature can be greater than 130° C., greater than 135° C., or greater than 140° C. In general, exposing adhesives in excessive high temperature for an extended period of time may cause excessive crosslinking or degradation of the adhesive. Excessive crosslinking would undermine the mechanical properties of the reactive adhesive layer, as shown by a reduction of storage modulus. This curing agent disclosed herein, e.g., a (bromized) alkyl phenol formaldehyde, can crosslink base copolymers under a broad range of temperatures and lengths of the period of time without causing excessive crosslinking, for example, the reactive adhesive layer can be cured at 155° C. to 185° C. for 10-30 minutes and still retain good storage modulus. In terms of upper limits, the time period for curing is less than 60 min, e.g., less than 40 min, or less than 30 min. In terms of lower limits, the time period for curing is greater than 5 min, e.g., greater than 8 min, or greater than 12 min. In some embodiments, the reactive adhesive layer can be cured at 160° C. for 10 minutes, or 185° C. for 20 minutes, and retains good mechanical properties required for a structure adhesive.

Production of the Reactive Adhesive Layer

The reactive adhesive layer can be produced by mixing in proper solvent various components disclosed above, e.g., the SIS, SB copolymers, the tackifiers and curing agent, to produce an adhesive solution. This process is commonly referred to as compounding. The compounding can occur under a temperature that is less than 50° C., e.g., between 20° C. and 40° C., or between 20° C. and 30° C., or under any temperature below the triggering temperature for curing.

Solvents that are suitable for dissolving the components of the reactive adhesive layer include, but are not limited to, aromatic solvents, ketones, aliphatic solvents and ester solvents. Such solvents may include ketones of from 3 to 15 carbon atoms (e.g., methyl ethyl ketone or methyl isobutyl ketone), alkylene glycols and/or alkylene glycol alkyl ethers having from 3 to 20 carbon atoms, acetates and their derivatives, ethylene carbonate, and other suitable solvents. Suitable alcohol solvents include mono-alcohols, such as methyl, ethyl, propyl, butyl alcohols, as well as cyclic alcohols such as cyclohexanol. In certain embodiments, a variety of acetate-type solvents may be used, such as n-butyl acetate, n-propyl acetate, and other acetate-type solvents. In preferred embodiments, the solvents are aromatic solvents. In certain embodiments, a portion of the solvent system may include water. In other embodiments, however, the solvent system may be devoid of water.

The amount of solvent(s) used for producing the reactive adhesive layer solution may vary depending on the desired viscosity. Typically the solvent is present in the reactive adhesive layer solution in an amount ranging from 25 wt % to 70 wt %, e.g., from 30 wt % to 65 wt %, from 40 wt % to 70 wt %, from 50 wt % to 70 wt %. In terms of lower limits, the solvent is present in an amount of greater than 30 wt %, greater than 40 wt %, greater than 50 wt %, or greater than 55 wt %, greater than 60 wt %, or about 58 wt %, based on the total weight of the reactive adhesive layer solution. In terms of upper limits, the solvent is present in an amount of less than 75 wt %, less than 70 wt %, or less than 65 wt %, based on the total weight of the reactive adhesive layer solution.

The reactive adhesive layer (and the adhesive solution thereof) can be used in a variety of applications. For example, it can be coated on a facestock, which is then processed and manufactured into labels. In some cases, it is used as a transfer adhesive without being associated with a facestock.

The reactive adhesive layer solution as prepared above has good coatability, with a typical viscosity of 100-5,000 cps, e.g., 200-4,000 cps, 300-3,000 cps, 400-2,000 cps, 300-600 cps, or about 500 cps. In terms of lower limits, the viscosity is greater than 100, e.g., greater than 200 cps, greater than 300 cps, or greater than 400 cps. In terms of upper limits, the viscosity is less than 5,000, less than 4,000 cps, less than 2,000 cps, less than 1,000 cps. Methods for measuring viscosity are well known, for example using the Brookfield Viscometer method, testing the flow resistance of the fluid by low and medium rate rotation.

Non-limiting examples of facestock that can be used include tissue, paper and film, e.g., a PET film, a polypropylene film, a Poly-vinyl Chloride film, a polyimide film, a polyethylene terephthalate film, a olefin film or a polyolefin film. In some embodiments, facestock used with the reactive adhesive layer are obtained from commercial sources, such as those available from Loparex, including products such as 1011, 22533 and 11404, CP Films, and Akrosil™

Coating

The reactive adhesive layer solution can be coated to a facestock using methods that are well known for solvent based adhesive, for example, as disclosed in *Manufacturing Pressure-Sensitive Adhesive Products: A Coating and Laminating Process*, available at www.adhesivesmag.com/articles/86079-manufacturing-pressure-sensitive-adhesive-products-a-coating-and-laminating-process, the content of which is hereby incorporated by reference in its entirety. The facestock that has been coated with the wet adhesive is then baked at a temperature to allow the solvent to evaporate. Preferably, the drying temperature for drying is lower than the curing triggering temperature to prevent crosslinking from occurring during the drying process.

In some embodiments, the coating is performed by direct coating, in which the pressure-sensitive adhesive is coated directly onto the facestock or backing material. In some embodiments, the coating is performed by transfer coating, in which the adhesive is first coated onto a release coated liner and transferred to the facestock or backing during the facestock/backing-to-liner lamination process.

Because of the unique composition of the reactive adhesive layer or a solution thereof, higher drying temperatures may be utilized without crosslinking the copolymers, which ultimately provides for superior label-substrate adhesion performance. In some embodiments, the drying temperature is no greater than 110° C., no greater than 105° C., or no greater than 100° C.

The inventors of the application have also discovered having a high solid content, for example, at least 25%, e.g., at least 30%, at least 35%, at least 40%, at least 45% or at least 50%, is beneficial because it allows for efficient drying. The reactive adhesive layer solution of this disclosure may in some embodiments have a solid content that ranges from 30 wt % to 75 wt %, e.g., from 35 wt % to 70 wt %, from 30 wt % to 60 wt %, from 20 wt % to 50 wt %, or from 30 wt % to 55 wt % based on the total weight of the reactive adhesive layer solution. In terms of lower limits, the solid content of the reactive adhesive layer solution is greater than 20 wt %, greater than 30 wt %, greater than 35 wt %, greater than 40 wt %, or greater than 50 wt %. In terms of upper limits, the solid content of the reactive adhesive layer solution is less than 70 wt %, less than 65 wt %, less than 60 wt %, less than 55 wt %, or less than 50 wt %. In one embodiment the solid content of the reactive adhesive layer solution is about 42 wt %.

Performance Characteristics

The reactive adhesive layer in this disclosure shows good adhesion performance, mechanical performance, repositionability and removability before curing. In some embodiments, the reactive adhesive layer may demonstrate a 180° C. peel strength that ranges from 5 Newton/inch to 30 Newton/inch according to the FINAT-1 method (2016), e.g., from 8 Newton/inch to 15 Newton/inch, or from 6 Newton/inch to 12 Newton/inch. In terms of lower limits, the reactive adhesive layer can demonstrate a peel strength of greater than 5 Newton/inch, e.g., greater than 6, greater than 8 Newton/inch. greater than 10 Newton/inch, greater than 12 Newton/inch, greater than 15 Newton/inch. In terms of upper limits, the reactive adhesive layer can demonstrate a peel strength of less than 100 Newton/inch, e.g., less than 80 Newton/inch, or less than 70 Newton/inch.

In one embodiment, the reactive adhesive layer demonstrates a sheer strength ranging from 1,000 min to 50,000 min on stainless steel before curing as measured using the FINAT-8 method (2016), e.g., from 8,000 min to 12,000 min, or from 9,000 min to 11,000 min. In terms of upper limits, the reactive adhesive layer can demonstrate a sheer strength of less than 18,000 min less than 15,000 min, less than 14,000 min, or less than 12,000 min. In terms of lower limits, the reactive adhesive layer can demonstrate a sheer strength of greater than 5,000 min, greater than 8,000 min, greater than 9,000 min, or greater than 10,000 min.

In some cases, the reactive adhesive layer demonstrates a storage modulus ranging from 6,000 Pa to 100,000 Pa at 25° C., e.g., 7,000 Pa to 60,000 Pa, or from 8,000 Pa to 50,000 Pa, or from 9,000 Pa to 30,000 Pa, or from 9,000 Pa to 12,000 Pa, or about 10,500 Pa before curing. In terms of upper limits, the reactive adhesive layer may demonstrate a storage modulus of less than 100,000 Pa, e.g., less than 30,000 Pa. or less than 20,000 Pa when measured at 25° C. In terms of lower limits, the reactive adhesive layer may demonstrate a storage modulus of greater than 6,000 Pa, e.g., greater than 7,000 Pa. or greater than 9,000 Pa before curing. When tested at 170° C., the reactive adhesive layer may demonstrate a storage modulus ranging from 100 Pa to 1,000 Pa, e.g., 300 Pa to 900 Pa, 400 Pa to 800 Pa, 450 Pa to 600 Pa, e.g., about 490 Pa. In terms of lower limits, the reactive adhesive layer may demonstrate a storage modulus at 170° C. of greater than 100 Pa, 200 Pa, 300 Pa, or 400 Pa. In terms of upper limits, the reactive adhesive layer may demonstrate a storage modulus at 170° C. of less than 1,500 Pa, 1,000 Pa, 800 Pa, or 700 Pa.

The reactive adhesive layer may demonstrate a lap shear ranging from 0.05 MPa to 0.5 MPa, e.g., from 0.08 Mpa to 0.3 MPa, or from 0.05 Mpa to 0.2 Mpa, or from 0.10 Mpa to 0.15 Mpa, or about 0.12 MPa on stainless steel before curing. In terms of upper limits, the reactive adhesive layer may demonstrate a lap shear of less than 2 MPa, e.g., less than 1.0 MPa. or less than 800 Pa. In terms of lower limits, the reactive adhesive layer may demonstrate a lap shear of greater than 0.05 MPa, e.g., greater than 0.08 MPa. or greater than 0.11 MPa before curing.

In some cases, the reactive adhesive layer demonstrates a D-shear strength ranging from 10 Newton/inch to 100 Newton/inch, from 20 Newton/inch to 100 Newton/inch, from 50 Newton/inch to 100 Newton/inch, from 40 Newton/inch to 80 Newton/inch, or about 60 Newton/inch to 90 Newton/inch, or about 89 Newton/inch before curing. In terms of upper limits, the reactive adhesive layer can demonstrate a D-shear strength of less than 300 Newton/inch, less than 200 Newton/inch, less than 150 Newton/inch, or less than 120 Newton/inch. In terms of lower limits, the reactive adhesive layer can demonstrate a D-shear strength of greater than 10 Newton/inch, greater than 30 Newton/inch, or greater than 40 Newton/inch, or greater than 50 Newton/inch.

The reactive adhesive layer is transformed into a structure adhesive upon curing at the conditions as described above. In some cases, the reactive adhesive layer is part of a label and the label is then permanently adhered to the substrate once the reactive adhesive layer is cured. The cured reactive adhesive layer is crosslinked and generally exhibits significantly increased storage modulus and lap shear strength as compared to the reactive adhesive layer having the same compositions and having not been cured. In some cases, curing may increase the storage modulus of the reactive adhesive layer by at least 4 times, e.g., at least 5 times, at least 7 times, at least 8 times, at least 9 times, at least 10 times and the lab shear on stainless steel also increased at least 2 times, e.g., at least 5 times, at least 7 times, at least 8 times, at least 9 times, at least 10 times or at least 12 times, or at least 15 times relative to the storage modulus of the reactive adhesive layer that has not being cured. In some cases, the cured reactive adhesive layer shows a storage modulus of at least 500 Pa at 170° C., e.g., at least 600 Pa, at least 1000 Pa, at least 1500 Pa, at least 2000 Pa, at least 2400 Pa, or about 2490 Pa. In some cases, the cured reactive adhesive layer exhibits a lap shear of at least 1.0 MPa, at least 1.20 MPa, at least 1.50 MPa, or at least 1.12 MPa on stainless steel. When measured at 25° C., the cured reactive adhesive layer may demonstrate a storage modulus ranging from 100,000 Pa to 900,000 Pa, e.g., from 150,000 Pa to 600,000 Pa, from 200,000 to 500,000 Pa, or about 239,000 Pa.

In some cases, after curing, for example, at 135° C.-200° C., e.g., 135° C. -180° C., or 150° C.-200° C. for 10-30 min, the cured reactive adhesive layer may demonstrate a D-shear strength ranging from 400 Newton/inch to 2,000 Newton/inch, from 500 Newton/inch to 1,500 Newton/inch, from 300 Newton/inch to 1800 Newton/inch, from 400 Newton/inch to 1,600 Newton/inch, or about 500 Newton/inch to 1,400 Newton/inch, e.g., about 1200 Newton/inch. In terms of upper limits, the reactive adhesive layer can demonstrate a D-shear strength of less than 2,000 Newton/inch, less than 1,000 Newton/inch, less than 900 Newton/inch, or less than 800 Newton/inch. In terms of lower limits, the reactive adhesive layer can demonstrate a D-shear strength of greater than 100 Newton/inch after curing, e.g., greater than 300 Newton/inch, or greater than 400 Newton/inch, or greater than 500 Newton/inch.

Methods for measuring storage modulus, the lap shear, steel peel strength, shear strength, Dynamic shear ("D-shear") are also well known, for example, D-shear can be measured according to FINAT FTM-18 method (2016); the 180° C. peel strength can be measured according to the FINAT FTM-1 (2016) method, shear strength can be measured according to on the FINAT FTM-8(2016) method; and lap shear can be measured according to the ASTM D1002 (2016) method. Storage modulus can be measured using rheology analysis of TA Rheometer using the temperature ramp mode. In general, storage modulus measurements negatively correlate with the temperature under which the test is performed; for the PSAs having identical compositions, the higher the temperature the lower value of the storage modulus measurement. In some instances, storage modulus of the reactive adhesive layer is tested at 25° C. In some embodiments, storage modulus is tested at 170° C.

Facestock Layer

The vulcanization label disclosed herein can have one or more facestock layers. In one embodiment, from the perspective of looking downward to the substrate, the facestock layer is on the top surface of the label, exposed to the environment and is configured to receive printable information, such as barcode or alphanumeric characters.

The facestock layer can include, for example, glassine, kraft, polyesters, such as polyethylene terephthalate (PET), polyamides (PA), polyethylene naphthalate (PEN), cotton, paper, fiberglass, synthetic textiles, polyolefins, such as polypropylene (PP), ethylene-propylene copolymers, polyethylene (PE), and combinations thereof. Other polymeric film materials include urethane based polymers such as polyether urethane and polyester urethane; amide based polymers including polyether polyamide copolymers; acrylic based polymers including a polyacrylate, and ethylene/vinyl acetate copolymer; polyester based polymers including a polyether polyester; a vinyl chloride; a vinylidene chloride; a polystyrene; a polyacrylonitrile; a polycarbonate; a polyimide; ABS; polyacrylate; polycarbonate (PC); polyamide; polyimide (PI); polyamidoimide; polyacetal; polyphenylene oxide (PPO); polysulfone, polyethersulfone (PES); polyphenylene sulfide; polyether ether ketone (PEEK); polyetherimide (PEI); metallized polyethylene terephthalate (PET); polyvinyl fluoride (PVF); polyethylene ether (PEE); fluorinated ethylene propylene (FEP); polyurethane (PUR); liquid crystal polymers (LCPs, class of aromatic polyester); polyvinylidene fluoride (PVDF); aramid fibers; DIALAMY, (polymer alloys); polyethylene naphthalate (PEN); ethylene/tetrafluoroethylene; (E/TFE); polyphenyl sulfone (PPSU); and polymers or polymer alloys containing one or more of these materials.

The thickness or coating weight of the facestock layer may vary depending on the stiffness of the label desired for particular applications. The facestock layer according to certain embodiments of the present invention may comprise a thickness ranging from 100 to 1,000 microns, e.g., from 200 to 800 microns, from 150 to 500 microns, from 300-600 microns, or from 450 to 900 microns, or other ranges in the foregoing amounts. In terms of lower limits, the facestock layer may have a thickness of at least 100 micron, e.g., at least 150 microns, at least 200 microns, or at least 300 micros. In terms of upper limits, the polyolefin films may have a thickness less than 1000 microns, e.g., less than 800 microns, less than 500 microns, less than 400 microns, or less than 300 microns. In some embodiments, the facestock layer is 125 microns.

The facestock layer may optionally be configured to be receptive to printing. For example, the facestock layer may contain one or more printable layers containing an ink-receptive composition that is utilized to form the printable information. A variety of such compositions are known in the art, and these compositions generally include a binder and a pigment, such as silica or talc, dispersed in the binder. Optionally, the printable layer comprises a crosslinker CX-100 (DSM's polyfunctional aziridine liquid crosslinker). A number of such ink-receptive compositions are described in U.S. Pat. No. 6,153,288, the disclosure of which is hereby incorporated by reference. Printable information can be deposited on the facestock layer using various printing techniques, such as screen printing, dot-matrix, ink jet, laser printing, laser marking, thermal transfer, and so on. In some cases, the facestock layer is receptive to thermal transfer printing.

The inks used for printing on the facestock layer may vary widely and may include commercially available water-based, solvent-based or radiation-curable inks. Examples of these inks include Sun Sheen (a product of Sun Chemical identified as an alcohol dilutable polyamide ink), SUN-TEX® MP (a product of Sun Chemical identified as a solvent-based ink formulated for surface printing acrylic coated substrates, PVDC coated substrates and polyolefin films), X-Cel (a product of Water Ink Technologies identified as a water-based film ink for printing film substrates), Uvilith AR-109 Rubine Red (a product of Daw Ink identified as a UV ink) and CLA91598F (a product of Sun Chemical identified as a multibond black solvent-based ink).

The facestock layer may contain one or more topcoats, which enhances printing performance, durability and/or chemical resistance. In one embodiment, the topcoat layer is configured as having its top surface in contact with the bottom surface of the printable layer in the facestock layer. In one embodiment, the topcoat layer of the label typically comprises a resin. Non-limiting examples of the resins that are suitable for use as topcoat include polyester-amino resin and a phenoxy resin, polyester-isocyanate, polyurethane, and polyacrylate.

In some cases, the facestock layer may be a facestock that utilizes activatable inks, e.g., stimulus-activatable inks, such as (for example) laser-activated, pressure-activated, or temperature-activated inks.

The topcoat layer, in accordance with certain embodiments of the present invention, may be applied onto the facestock portion of the facestock layer by any known techniques in the art, such as spray, roll, brush, or other techniques. The printable layer can be formed by depositing, by gravure printing or the like, on the topcoat layer, with the bottom surface in contact with the top surface of the topcoat layer.

Liner

In some embodiments, the vulcanization label further includes a liner deposited on the opposite side of the surface of the reactive adhesive layer that contacts the second primer layer. A releasable liner can be positioned adjacent to the reactive adhesive layer such that the reactive adhesive layer is disposed, or sandwiched, directly or indirectly between the bottom surface of the second primer layer and the releasable liner. The releasable liner may function as a protective cover such that the release liner remains in place until the label is ready for attachment to an object. If a liner or release liner is included in the label, a wide array of materials and configurations can be used for the liner. In many embodiments, the liner is a paper or paper-based material. In many other embodiments, the liner is a polymeric film of one or more polymeric materials. Typically, at least one face of the liner is coated with a release material such as a silicone or silicone-based material. As will be appreciated, the release coated face of the liner is placed in contact with the otherwise exposed face of the reactive adhesive layer. Prior to application of the label to a surface of interest, the liner is removed to thereby expose the adhesive face of the label. The liner can be in the form of a single sheet. Alternatively, the liner can be in the form of multiple sections or panels.

Other additives can be added to one or more of the facestock layer, the first primer layer, the second primer layer, the reactive adhesive layer, or liner layers to obtain a certain desired characteristic. These additives can include, for example, one or more waxes, surfactants, talc, powdered silicates, filler agents, defoamers, colorants, antioxidants, UV stabilizers, luminescents, crosslinkers, buffer agents, anti-blocking agents, wetting agents, matting agents, antistatic agents, acid scavengers, flame retardants, processing aids, extrusion aids, and others.

The liner used in the label may have a thickness ranging from 20 to 150 micron, e.g., from 30 to 120 micron, from 60 to 100 micron, or from 50 to 90 micron. In terms of upper limits, the thickness of the label is less than 150 micron, e.g., less than 130 micron, or less than 100 micron. In terms of lower limits, the thickness of the label is greater than 20 micron, e.g., greater than 30 micron, or greater than 40 micron.

Producing the Labels

The present invention also relates to a method of manufacturing labels disclosed herein. The method comprise producing a first primer solution, a second primer solution and an adhesive solution as described above. The first primer can be coated on the facestock layer by gravure coating. In some cases, as shown in Example 1, the primer solution is coated on the facestock layer with a gravure roller to form a film/first primer complex and the film/first primer complex is then exposed to a temperature that is sufficiently high to allow solvent to evaporate. Typically the baking temperature is 120° C. or less to prevent premature curing of the primer ("precuring"), i.e., the primer is cured before the label is attached to the rubber article or before the labeled rubber article is vulcanized. The method comprises coating the second primer on the dried first primer layer/facestock layer complex to form facestock layer/a first primer/second primer complex. The method further comprises coating the adhesive solution on the substrate or a liner. Any coating method suitable for coating solvent-borne adhesive can be used to coat the adhesive solution on the liner or substrate. In some cases, the coating is comma roll or 3-roll reverse roll coating. The reactive adhesive layer/liner complex are dried under 120° C. or less. Optionally, the method further comprises laminating the reactive adhesive layer with the facestock layer/the first primer/the second primer to produce the label.

Label Rubber-Based Articles

The present invention also relates to methods of applying a vulcanization label disclosed herein to a rubber article, e.g., a tire. The methods include providing a rubber article defining an outer surface, and a label in accordance with an embodiment. The methods further include affixing the label to the outer surface of the rubber article, thereby applying the label to the rubber article.

The present invention also relates to labeled rubber-based articles, e.g., tires that include a label of the present invention. The labeled rubber-based article include a rubber article defining an outer surface, and a label as described above that is adhered to the outer face of the article. In some embodiments, the article is a green tire. In some embodiments, the outer surface of the article is rubber.

The labels can be applied to one or more surfaces of a rubber-based article such as a tire inner side wall and/or a tire outer side wall. The labels can also be embedded or otherwise incorporated within a rubber-based article such that the label is entirely or partially hidden from view.

The labels can be affixed to one or more rubber articles in a batch, continuous, or semi-continuous fashion. Prior to application, one or more liners can be removed from the labels to thereby expose the adhesive face of the labels. The adhesive face and label is then contacted with the container (s) or article(s) and the labels applied thereto. Adhering may also include one or more operations of pressing or otherwise applying a pressing force against the label to promote contact and/or adhesion with the container; activating and/or curing of the adhesive such as by heating and/or exposure to UV light; and/or drying operations.

Vulcanization

The labeled rubber article can then be vulcanized at a temperature that ranges from 150° C. to 200° C., e.g., 160° C. to 190° C., 160° C. to 185° C., 165° C. to 175° C., 170° C. to 185° C. In terms of upper limits, the vulcanization temperature can be less than 200° C., less than 195° C., less than 190° C., or less than 185° C. In terms of lower limits, the vulcanization temperature can be greater than 150° C., greater than 160° C., greater than 155° C., or greater than 165° C. In some cases, vulcanization can be performed under a pressure of 1-4 Mpa, e.g., 1-3 Mpa, 2-3 Mpa, or 1.5-2.5 Mpa. In terms of upper limits, the pressure is less than 4 Mpa, less than 3.2 Mpa, less than 3 Mpa, or less than 2 Mpa. In terms of lower limits, the pressure is greater than 1 Mpa, greater than 1.5 Mpa, or greater than 2 Mpa.

Performance

The labels disclosed herein provide superior performance with respect to adhesion, reposition, and converting performance according to methods well known in the art.

For example, the labels demonstrate high peel strength. Peel strength reflects the bond strength of the adhesive and is typically measured by the average load per unit width of bond line required to separate bonded materials where the angle of separation is 180 degrees. Peel strength is thus commonly referred to as 180° C. peel strength. The peel strength of the label can be evaluated using FINAT Testing Method FTM1.

The labels may demonstrate a pre-vulcanization 180° C. peel strength of of 5-25 N/inch on stainless steel. The labels may demonstrate a post-vulcanization 180° C. peel strength of greater than 50 N/inch on stainless steel Importantly, the labels demonstrate excellent peel strength performance on green rubber. In some cases, the peel strength is greater than 200 N/inch.

In some cases, performance may be measured via a failure mode test using. For example, the label is vulcanized on the green rubber and then manually peeled off the label from the rubber. The performance is determined based on how easily the label can be peeled and whether the peeling would cause damage to the rubber: if the label cannot be peeled off without damaging the rubber, the performance value is 5; if part of the label can be peeled off and the rest can't be peeled off without damaging the rubber, the performance value is 3; if the label can be peeled completely off the rubber without damaging the rubber, the performance value is 1. 2 represents a performance between 1 and 3, and 4 represents a performance between 3 and 5. In certain embodiments, the size of the label is 0.5 inch×0.5 inch;

EXAMPLES

The following examples are offered to illustrate, but not to limit the claimed invention.

Example 1

Label Preparation

A first primer solution (THIXON™ P-11-EF) was coated on a PET facestock layer using a gravure roller. The coated PET film was then heated at a temperature gradient of 60/80/120° C. to evaporate the solvent. The highest temperature of the gradient was kept under 120° C. to prevent pre-curing of first primer layer. After the coated facestock layer was completely dry, the gravure process was employed to coat a second primer solution (THIXON™ 520-P-EF) to the coated facestock. The film/first primer/second primer complex was dried using the same process in the same oven.

THIXONP-11-EF comprises titanium dioxide, carbon black, phenolic resin, chlorinated rubber, and zinc oxide (as well as other components as shown in Table 1 above). THIXON520-P-EF comprises carbon black, phenolic resin, chlorinated rubber, epoxy resin, and zinc oxide (as well as other components as shown in Table 2 above). THIXON520-P-EF contains a larger amount of zinc oxide than THIXONP-11-EF.

A reactive adhesive solution was prepared by combining 3270 SIS (copolymer) in an amount of 12.55 wt %, 1205 SB (copolymer) in an amount of 8.35 wt %, Wingtack 10 (tackifier) in an amount of 9.94 wt %, toluene in an amount of 45.28 wt %, C6100 (tackifier) in an amount of 11.48 wt %, GA100F in an amount of 9.3 wt %, SP1056 in an amount of 3.1 wt %. The reactive adhesive solution was coated on a silicone-coated liner using the 3 roller coating method and dried in the continuous oven with gradient as described above. The assembled film/first primer/second primer was then laminated with the liner/adhesive complex to form the label.

The resultant labels comprised a white PET film having a thickness of 125 micron, a first primer layer having a coating weight of 2 gsm, a second primer layer having a coating weight of 7 gsm, the concentration of zinc oxide in the first primer layer was lower than that in the second primer layer, a reactive adhesive layer having a coating weight of 25 gsm, and a silicone PET liner having a thickness of 50 micron.

A group of five (5) labels were vulcanized at 160° C. for 10 min and a second group of five (5) labels were vulcanized at 180° C. for 20 min. The labels were evaluated for pre-vulcanization and post-vulcanization 180° C. peel strength using the FTM 1 method. The testing was conducted on both stainless steel and green rubber for each group. As shown in Table 3, the labels demonstrate desirable pre-vulcanization peel values, which beneficially provide for good adhesion, reposition, and removability. Importantly, after exposure to the high temperature and pressure of the tire vulcanization process, the labels advantageously demonstrate significantly higher peel values, which are highly desirable for validating the quality of tire throughout the whole life cycle. It is believed that the labels actually become structurally bonded to the cured rubber. The testing further shows that the labels can be sufficiently cured under a wide range of vulcanization conditions.

TABLE 3

| Peel strength test before and after vulcanization | | | |
|---|---|---|---|
| | before | after vulcanization | |
| Item | vulcanization | 160° C./10 min | 180° C./20 min |
| 180° peel strengthen (on stainless steel) | 15~25N/inch | >50N/inch | >50N/inch |
| 180° peel strengthen (on green rubber) | 10~15N/inch | >200N/inch | >200N/inch |

Example 2

Effect of Different Primer Layers

Additional vulcanization labels were produced as described above. The coating weights of the first and second primers were also varied. A failure mode adhesion test as described herein was used to evaluate the performance of the labels. For this testing, the dimensions of the each label were 0.5 inch×0.5 inch. The adhesion performance results are shown in Table 4. Adhesion performance was evaluated using a scale of 1 to 5, wherein:

5 is very good, e.g., the label cannot be peeled off without damaging the rubber;

3 is average, e.g., part of the label can be peeled off and the rest can't be peeled off without damaging the rubber 1 is poor, e.g., the label can be peeled completely off the rubber without any damage on rubber.

TABLE 4

| Coating weight and adhesion strength | | | | |
|---|---|---|---|---|
| Ex./ | Coating weight (gsm) | | Vulcanization test | |
| Comp. Ex. | Primer 1 | Primer 2 | 160° C./10 min | 180° C./20 min |
| A | 1 | 1 | 1 | 1 |
| B | 3 | 3 | 1 | 1 |
| 1 | 6 | 6 | 3 | 3 |
| 2 | 10 | 10 | 4 | 4 |
| 3 | 5 | 8 | 5 | 5 |
| 4 | 3.4 | 5 | 5 | 5 |
| 5 | 3.4 | 10 | 5 | 5 |
| 6 | 6.5 | 3.5 | 5 | 5 |
| 7 | 6.5 | 8.8 | 5 | 5 |
| 8 | 9.4 | 9.5 | 4 | 3 |
| 9 | 9.4 | 5.2 | 4 | 3 |

The labels that demonstrated peel test values from 3-5 were deemed to show good performance for labeling tires, with 5 being the best. Importantly, the results show that comparative examples A and B, each comprising a second primer layer having a coating weight of equal to or less than 3 gsm, which utilize different first and second primer coating weights showed predominantly poor adhesive strength—mostly 1 and 2. In contrast, the all of working examples 1-9, having a second primer layer that has a coating weight of greater than 3 gsm, demonstrated the good performance. These results show that maintaining proper coating weight for the second primer layer is important for the performance of the labels.

Example 3

Effect of Primer Combinations on Performance

Four groups of labels, five labels per group, were produced using the first primer layer, second primer layer, and reactive adhesive layer described in Example 1. Comparative example C comprised only one primer layer (THIXON P-11-EF) sandwiched between the facestock layer and the reactive adhesive layer. Comparative example D comprised only one primer layer (THIXON 520-P-EF) sandwiched between the facestock layer and the reactive adhesive layer. Comparative example E comprised two primer layers between the facestock layer and the reactive adhesive layer, the first primer layer was THIXON 520-P-EF and was in contact with the facestock layer and the second primer layer was THIXON P-11-EF and was in contact with the reactive adhesive layer. Comparative example F utilized only one primer layer, which had the same composition as the first primer layer in Example 1 with the addition of epoxy resin in an amount of 1.5 wt %. Working example 3 contains two primer layers sandwiched between the facestock layer and the reactive adhesive layer; the first primer layer comprising THIXON P-11-EF and being in contact with the facestock layer and the second primer layer comprising THIXON 520-P-EF and being in contact with the reactive adhesive layer.

The labels were tested using the vulcanization test described above. The results are also shown in Table 5. Working example 3 is included for comparison.

TABLE 5

Primer combinations and adhesion strength

| Ex./Comp Ex. | Primer combination | Coating weight (gsm) | Vulcanization test 160° C./10 min | 180° C./20 min |
|---|---|---|---|---|
| C | THIXON P-11-EF | 2 | 1 | 1 |
| D | THIXON 520-P-EF | 6 | 1 | 1 |
| E | THIXON 520-P-EF/ THIXON P-11-EF | 6/2 | 1 | 1 |
| F | THIXON P-11-EF + 1.5 wt % epoxy resin | 2 | 1 | 1 |
| 3 | THIXON P-11-EF/ THIXON 520-P-EF | 5/8 | 5 | 5 |

The results showed that labels having one primer layer, either the first primer layer or the second primer layer, had poor adhesion performance. Since having one primer layer is equivalent to having two primer layers with identical compositions, the results showed that having two primers of different compositions are important to performance of the vulcanization label. In addition, comparative example E, the primer layer with the high zinc oxide content and comprising epoxy resin (as in THIXON 520-P-EF) was not in contact with the reactive adhesive layer. This change in configuration surprisingly demonstrated significantly poorer performance. This testing indicates that the configuration of the primers as arranged in the label is important for overall label performance. In preferred embodiments, the optimal configuration of the label has the first primer layer in contact with at least a portion of the facestock layer and the second primer layer in contact with at least a portion of the reactive adhesive layer. Consistent with the results in Table 4, the results in Table 5 also show the second primer layer that has a coating weight that is greater than 3 gsm is associated with enhanced adhesion performance.

Example 4

Reactive Adhesive Preparation

The term "HPR-PSA" used in Examples 4-7 is synonymous with the term "reactive adhesive." A reactive adhesive solution was prepared by dissolving in solution the component listed in Table 6.

TABLE 6

Reactive Adhesive Solution Components

| Component (Manufacturer) | Weight amount | Weight percentage |
|---|---|---|
| QUINTAC 3270 SIS (ZEON Chemical) | 9.6 | 22.6% |
| KIBIPOL PR-1205 SB (CHIMEI) | 6.4 | 15.2% |
| Wingtack 10 (hydrocarbon resin) (Cray Valley) | 7.6 | 18.1% |
| Toluene (solvent) | 58 | — |
| Regalite C6100 (hydrocarbon resin) (Eastman) | 8.8 | 21.0% |
| GA100F (rosin resin) (ARAKAWA) | 7.2 | 17.1% |
| Phenolic resin SP1056 (SI Group) | 2.4 | 5.7% |

The curing agent used in the reactive adhesive, SP1056, is a bromized alkyl phenol formaldehyde and has a methylol group content of 9-11%. The HPR-PSA solution prepared above had a viscosity of 500 cps at 25° C. and had solid content of 42 wt %. The HPR-PSA was coated on 120 um PET film and dried at a temperature of lower than 110° C. to produce HPR-PSA labels.

The labels were tested for 180° C. peel strength on stainless steel at 23° C., 50% humidity according to FINAT FTM-1, with a balance time being 20 min and the width of the label being 1 inch and the peel rate being 300 mm/min. The balance time refers to the time of the label adhereing on the substrate during the testing.

The shear strength on stainless steel was measured at 23° C., 50% humidity according to on the FINAT FTM-8 (2016) method with a balance time being 15 minutes and the width of the label being 0.5 inch.

D-shear was measured at 23° C., 50% humidity according to FINAT FTM-18 (2016) with a balance time being 20 minutes, the width of label being 0.5 inch, and the peel rate being 5 mm/min.

Lap shear was measured at 23° C., 50% humidity according to the ASTM D1002 (2016) method. Two metal plates, with a thickness of 1.62 mm and an overlap of 12.7 mm (0.5"), were bonded with adhesive at testing. The adhesive specimen was 25.4 mm (1") wide.

Storage modulus was measured using rheology analysis of TA Rheometer using the temperature ramp mode. The temperature ramped from −50° C. to 120° C. with 3° C./min heating rate and the angular frequency was 10 rad/s.

The label demonstrated a 180° C. peel strength of 16.5 Newton/inch on stainless steel, and a shear strength above 10000 min, and a D-shear strength of 89 Newton/inch on stainless steel.

The label was then cured at 160° C. for 10 min and tested for D-shear strength. The cured HPR-PSA demonstrated a D-shear strength of 1200 Newton/inch, significantly higher than those of the PSA before the curing. Likewise, the measurement of lap shear was increased to 1.12 Mpa and storage modulus were also significantly increased to 239,000 Pa when measured at 25° C. The comparison of the HPR-PSA before and after curing is shown in Table 7. The results indicate curing the HPR-PSA having the disclosed composition resulted in significant improvement in mechanical performance.

TABLE 7

Performance Characteristics of the HPR-PSA

| | Before curing | After curing at 160° C. for 10 min |
|---|---|---|
| Lap shear strength (Mpa) | 0.12 | 1.12 |
| D-shear (Newton/inch) | 89 | 1200 |
| Storage modulus (Pa) | 10500(25° C.) | 239000(25° C.) |
| 180° C. peel strength (Newton/inch) | 16.5 | — |
| Shear strength (min) | above 10,000 | — |

Figure 3:
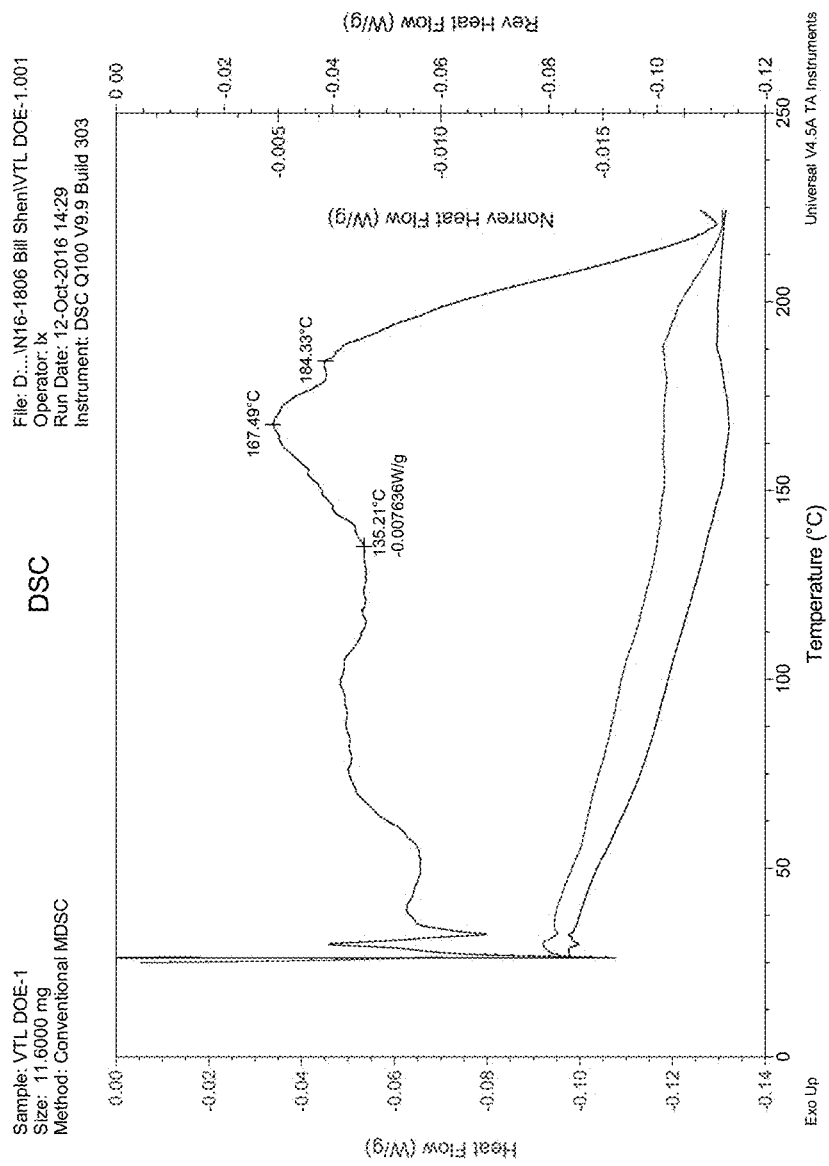
FIG. 3 shows the result of a DSC analysis of the HPR-PSA demonstrating the reactivity of the adhesive and change in performance after the curing reaction.
Figure 4:
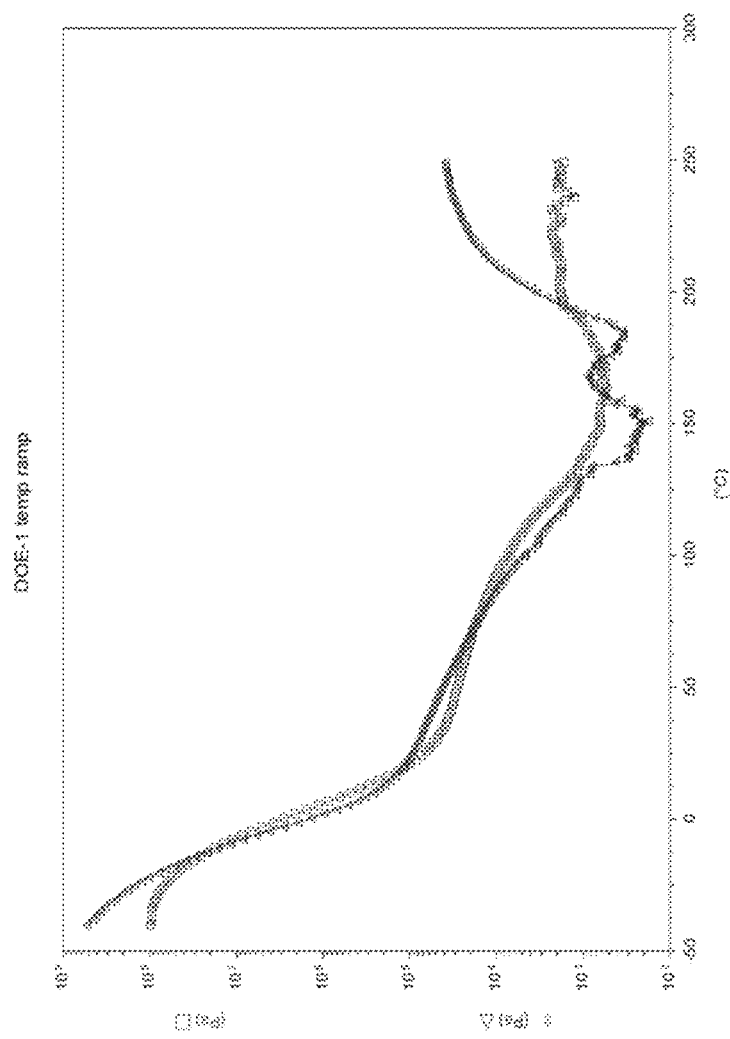
FIG. 4 shows the results of a rheology analysis demonstrating the reactivity of the adhesive and change in performance after the curing reaction.
Figure 5:
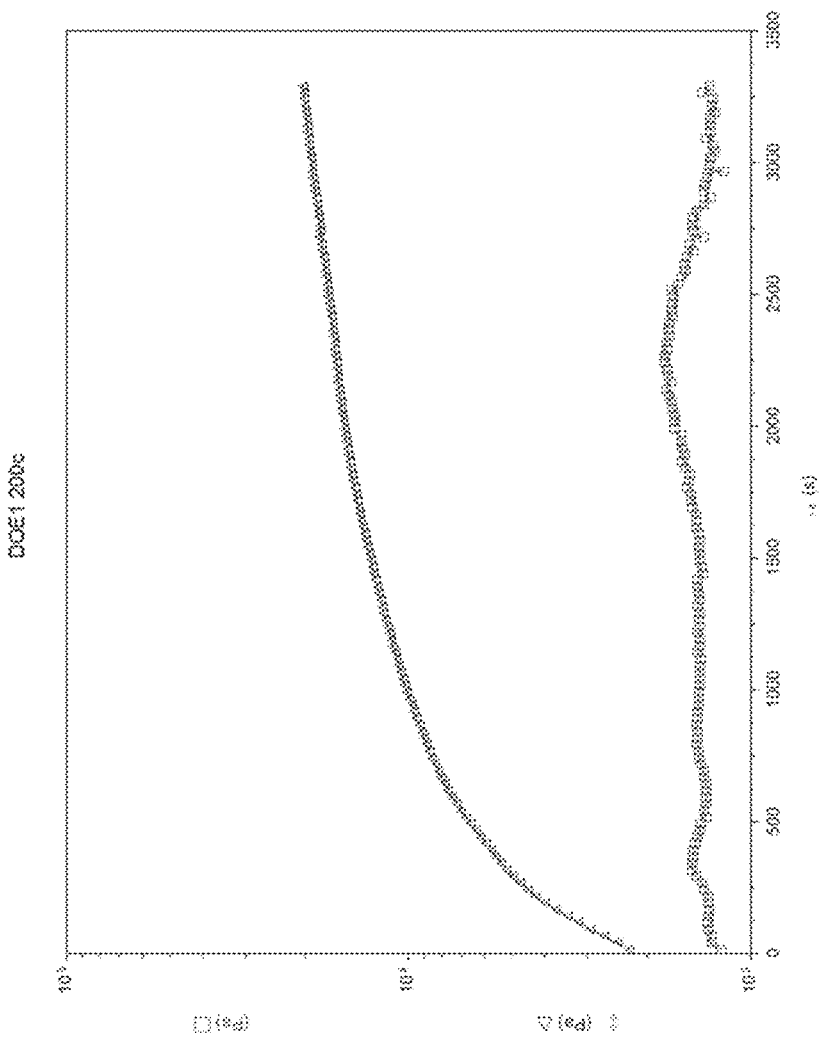
FIG. 5 shows the results of time scanning experiments (at 200° C.) to show operation window for curing the HPR-PSA.
Figure 6:
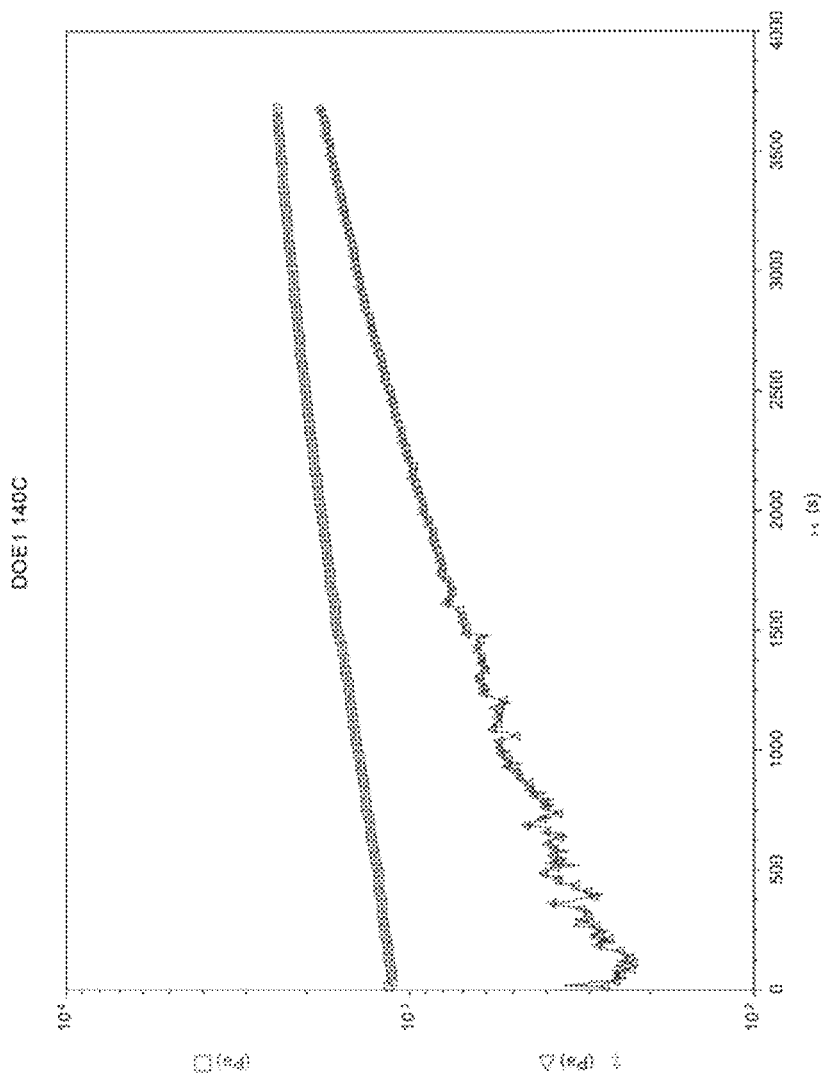
FIG. 6 shows the results of experiments of time scanning (at 140° C.) to show operation window for curing of the HPR-PSA.

FIG. 3 shows results of the DSC analysis which indicates that the trigger temperature for curing was around 135° C., where an exothermic peak started to form as the temperature increases. FIG. 4 shows results from rheology analysis by temperature ramp, which shows that the storage modulus (indicated by the blue line) continued to decrease as the temperature gradually increased to about 140° C., and when temperature continued to rise to 140° C. and higher the storage modulus increased dramatically. Time scanning experiments of curing at 200° C. (FIG. 5) and at 140° C. (FIG. 6) indicate that the storage modulus (also indicated by the blue lines) of the HPR-PSA steadily increased with time at both temperatures, reflecting that curing conferred increased mechanical performance. The steady increases of storage modulus also indicate no degradation or excessive crosslinking occurred while the HPR-PSA was being cured under either condition.

Example 5

Effect of Curing Agent on Lap Shear

Reactive adhesives were prepared as described above. These reactive adhesives contained the identical compositions as disclosed in Example 4 except for the varying amounts of curing agent, the weight percentages of which are shown in Table 8, below. The HPR-PSAs were cured under the same condition as disclosed in Example 4 and the lap shear strength of each HPR-PSA was measured.

TABLE 8

Lap Shear Strength

| | 1 | 2 | 3 | 4 | 5 | 6 | 7 | 8 | 9 |
|---|---|---|---|---|---|---|---|---|---|
| Cure agent amount (wt %) | 0 | 0.50 | 1 | 2 | 4 | 6 | 10 | 15 | 30 |
| Lap shear strength (MPa) | 0.12 | 0.12 | 1.3 | 2.73 | 1.95 | 1.41 | 1.05 | 1.35 | 0.81 |

As shown in Table 7, most examples (except for example 1, which did not utilize a curing agent) demonstrated high lap shear results. In particular, examples 3-8 showed particularly high lap shear values. However, the lap shear decreased significantly when the curing agent amount increased to 30 wt % (example 9). This indicates HPR-PSAs having the curing agent in an amount ranging from 1 wt % to 15 wt % had optimal mechanical properties after being cured.

Example 6

Performance of the HPR-PSA

In this example, a HPR-PSA was manufactured as described in Example 4. The HPR-PSA was cured at 170° C. for 10 min. The storage modulus before and after curing were measured and the HPR-PSA demonstrated a storage modulus at 170° C. of 490 Pa before curing and a storage modulus at 170° C. of 2490 Pa after curing.

Example 7

Effect of Curing Agent on Cross Linking

HPR-PSAs were manufactured as described above. These HPR-PSAs contained the identical compositions as disclosed in Example 4 except for the varying amounts of curing agent, the weight percentages of which are shown in Table 9, below. Three HPR-PSAs for each curing agent amount were manufactured. The HPR-PSAs were cured under the same conditions as in Example 4. The wt % of gel content, which represents the degree of crosslinking, was measured.

TABLE 9

Degree of Crosslinking

| Curing agent amount (wt %) | wt % Gel Content | | | Average (wt %) |
|---|---|---|---|---|
| 0 | 1.9 | 1.9 | 2.1 | 2.0 |
| 0.50 | 1.7 | 0.4 | 2.5 | 1.5 |
| 6 | 23.0 | 24.0 | 26.2 | 24.4 |
| 15 | 41.7 | 41.0 | 41.1 | 41.3 |

As shown in Table 9, the HPR-PSAs prepared with little or no curing agent showed low degrees of crosslinking, e.g., 2.5 wt % or less. The HPR-PSAs prepared using greater amounts of curing agent demonstrated significantly improved mechanical performance. HPR-PSAs prepared using 6 wt % and 15 wt % of curing agent, showed degrees of crosslinking of 24.4% and 41.3%, respectively.

Embodiments

Exemplary embodiments provided in accordance with the presently disclosed subject matter include, but are not limited to, the claims and the following embodiments:

Embodiment 1: A label comprising: a facestock layer, a first primer layer, a second primer layer comprising a zinc oxide, and a reactive adhesive layer, wherein the two primer layers have different compositions and wherein the second primer layers has a coating weight that is greater than 3 gsm, and wherein at least a portion of the second primer is in contact with at least a portion of the reactive adhesive layer.

Embodiment 2: an embodiment of embodiment 1, wherein the first primer comprises at least one of carbon and a zinc oxide.

Embodiment 3: an embodiment of embodiments 1 or 2, wherein the reactive adhesive layer comprises: a first rubber comprising a styrene-isoprene-styrene ("SIS") copolymer; a second rubber comprising a styrene-butadiene ("SB") copolymer; a tackifier comprising a compound selected from a hydrocarbon resin, a rosin resin, and mixtures thereof; and a curing agent comprising a phenolic resin.

Embodiment 4: A label comprising: a facestock layer; one or more primer layers; and a reactive adhesive layer comprising: a first rubber comprising a styrene-isoprene-styrene ("SIS") copolymer, and a second rubber comprising a styrene-butadiene ("SB") copolymer, a tackifier comprising a compound selected from the group consisting of a hydrocarbon resin, a rosin resin, and mixtures thereof; and a curing agent comprising a phenolic resin.

Embodiment 5: an embodiment of any of the preceding embodiments, wherein the label comprises two primer layers and the two primer layers have different compositions and wherein at least one of the first and second primer layers has a coating weight that is greater than 3 gsm.

Embodiment 6: an embodiment of any of the preceding embodiments, wherein the first primer is in contact with at least a portion of the facestock layer.

Embodiment 7: an embodiment of any of the preceding embodiments, wherein the weight ratio of SIS to SB copolymers ranges from 4:1 to 0.25:1.

Embodiment 8: an embodiment of any of the preceding embodiments, wherein both the first and second primer layers comprise zinc oxide Embodiment 9: an embodiment of any of the preceding embodiments, wherein the first primer layer further comprises titanium dioxide.

Embodiment 10: an embodiment of any of the preceding embodiments, wherein the first primer layer and the second primer layer comprise carbon and zinc oxide, and wherein the weight ratio of zinc oxide in the first primer to zinc oxide in the second primer ranges from 0.05:1 to 1:1.

Embodiment 11: an embodiment of any of the preceding embodiments, wherein the first primer layer is essentially free of epoxy resin.

Embodiment 12: an embodiment of any of the preceding embodiments, wherein the second primer layer is essentially free of titanium dioxide.

Embodiment 13: an embodiment of any of the preceding embodiments, wherein the reactive adhesive layer is essentially free of zinc oxide.

Embodiment 14: an embodiment of any of the preceding embodiments, wherein the first primer layer comprises: titanium oxide, zinc oxide, phenolic resin, and chlorinated rubber.

Embodiment 15: an embodiment of any of the preceding embodiments, wherein the first primer layer comprises: from 12 to 20 wt % titanium dioxide; from 4 to 10 wt % carbon, and from 2 to 8 wt % zinc oxide, based on the weight of the first primer layer.

Embodiment 16: an embodiment of any of the preceding embodiments, wherein the first primer layer comprises: from 4 to 40 wt % phenolic resin; and/or from 40 to 80 wt % chlorinated rubber, based on the weight of the first primer layer.

Embodiment 17: an embodiment of any of the preceding embodiments, wherein the second primer layer comprises: zinc oxide, carbon, phenolic resin, chlorinated rubber, and bisphenol-A-epichlorthdrin epoxy resin.

Embodiment 18: an embodiment of any of the preceding embodiments, wherein the second primer layer comprises: from 4 to 10 wt % carbon; from 4 to 12 wt % zinc oxide; and/or from 0.4 to 2 wt % epoxy resin based on the weight of the second primer layer.

Embodiment 19: an embodiment of any of the preceding embodiments, wherein the second primer layer comprises: from 0.4 to 2 wt %, bisphenol-A epichlorhydrin epoxy resin based on the weight of the second primer layer.

Embodiment 20: an embodiment of any of the preceding embodiments wherein the second primer layer comprises from 4 to 40 wt % phenolic resin; and from 40 to 80 wt % chlorinated rubber based on the weight of the second primer layer.

Embodiment 21: an embodiment of any of the preceding embodiments, wherein the epoxy resin has an average molecular weight that ranges from 100 to 700 g/mol.

Embodiment 22: an embodiment of any of the preceding embodiments, wherein the facestock layer has a thickness ranging from 100 microns to 1000 microns.

Embodiment 23: an embodiment of any of the preceding embodiments wherein the facestock layer is receptive to thermal transfer printing.

Embodiment 24: an embodiment of any of the preceding embodiments, wherein the facestock layer further comprises a topcoat.

Embodiment 25: an embodiment of any of the preceding embodiments, wherein the second primer layer has a coating weight ranging from 3 to 15 gsm.

Embodiment 26: an embodiment of any of the preceding embodiments, where in the first primer layer has a coating weight ranging from 1-8 gsm.

Embodiment 27: an embodiment of any of the preceding embodiments, wherein the coating weight ratio of the first primer to the second primer ranges from 0.2:1 to 2:1.

Embodiment 28: an embodiment of any of the preceding embodiments, further comprising a liner.

Embodiment 29: an embodiment of any of the preceding embodiments, wherein the liner has a thickness ranging from 20 to 150 micron.

Embodiment 30: an embodiment of any of the preceding embodiments, wherein the curing agent comprises a phenolic derivative and is essentially free of sulfur.

Embodiment 31: an embodiment of any of the preceding embodiments, wherein the phenolic derivative comprises bromized phenol formaldehyde.

Embodiment 32: an embodiment of any of the preceding embodiments, wherein the amount of SIS copolymer ranges from 10 to 40% based on the total weight of the adhesive.

Embodiment 33: an embodiment of any of the preceding embodiments, wherein the amount of SB copolymer ranges from 10 to 40% based on the total weight of the adhesive.

Embodiment 34: an embodiment of any of the preceding embodiments, wherein the weight ratio of combined polymer to tackifier ranges from 0.5:1 to 2:1.

Embodiment 35: an embodiment of any of the preceding embodiments, wherein the amount of rosin resin in the adhesive ranges from 0 to 50% based on the total weight of the adhesive.

Embodiment 36: an embodiment of any of the preceding embodiments, wherein the amount of hydrocarbon resin in the adhesive ranges from 0 to 50% based on the total weight of the adhesive.

Embodiment 37: an embodiment of any of the preceding embodiments, wherein the adhesive has a coating weight that ranges from 10 gsm-80 gsm.

Embodiment 38: an embodiment of any of the preceding embodiments, wherein the label demonstrates a 180° C. peel strength of that ranges from 15 to 25 N/inch on stainless steel.

Embodiment 39: an embodiment of any of the preceding embodiments, wherein the label demonstrates a 180° C. peel strength that ranges from 3 to 10 N/inch on green rubber.

Embodiment 40: an embodiment of any of the preceding embodiments, wherein the label demonstrates a 180° C. peel strength of greater than 50 N/inch on stainless steel after vulcanization at 160° C. for 10 min or vulcanization at 180° C. for 20 min.

Embodiment 41: an embodiment of any of the preceding embodiments, wherein the label demonstrates a 180° C. peel strength of greater than 200 N/inch on green rubber after vulcanization at 160° C. for 10 min or vulcanization at 180° C. for 20 min.

Embodiment 42: A method of producing a label, comprising a) providing a first primer solution comprising components dispersed in a first complex solvent, and a second primer solution comprising zinc oxide dispersed in a second complex solvent, wherein the first and second primer solution have different compositions, b) coating the first primer solution on a facestock layer to form a film/first primer complex, c) drying the first primer/film complex, d) coating the second primer solution on the first primer in the film/first primer complex to form a film/first primer/second primer complex, and e) drying the film/first primer/second primer complex.

Embodiment 43: an embodiment of embodiment 42, wherein the components in the first primer solution comprise titanium oxide, zinc oxide, phenolic resin, chlorinated rubber, and/or carbon.

Embodiment 44, an embodiment of embodiment 42 or 43, wherein the second primer solution further comprises phenolic resin, chlorinated rubber, epoxy resin and/or carbon.

Embodiment 45, an embodiment of any of embodiments 42-44, wherein step (b) and/or step (d) is performed by gravure coating.

Embodiment 46, an embodiment of any of embodiments 42-45, wherein the first complex solvent is selected from the group consisting of xylene, methyl pentanone, and mixtures thereof.

Embodiment 47, an embodiment of any of embodiments 42-46, wherein the second complex solvent is selected from the group consisting of xylene, ethyl benzene, isopropy alcohol, and mixtures thereof.

Embodiment 48, an embodiment of any of embodiments 42-47, further comprising laminating the dried film/first primer/second primer complex with a reactive adhesive layer.

Embodiment 49, an embodiment of any of embodiments 42-48, wherein the adhesive layer is coated with on a liner before being laminated with the dried film/first primer/second primer complex.

Embodiment 50: A method of labeling a tire, comprising attaching the label from any of the preceding paragraphs to a tire.

Embodiment 51: an embodiment of embodiment 50, wherein the tire with the label attached is vulcanized at a temperature ranging from 150 to 200° C. for 10-20 min and under the pressure of at least 1 Mpa.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the invention.

We claim:

1. A label comprising:
   a facestock layer,
   a first primer layer,
   a second primer layer comprising a zinc oxide, and
   a reactive adhesive layer,
   wherein the two primer layers have different compositions and wherein the second primer layer has a coating weight that is greater than 3 gsm, and wherein at least a portion of the second primer is in contact with at least a portion of the reactive adhesive layer,
   wherein the reactive adhesive layer comprises a first rubber comprising a styrene-isoprene-styrene ("SIS") copolymer; a second rubber comprising a styrene-butadiene ("SB") copolymer; a tackifier comprising a compound selected from a hydrocarbon resin, a rosin resin, and mixtures thereof; and
   a curing agent comprising a phenolic resin.

2. The label of claim 1, wherein the first primer layer comprises at least one of carbon and a zinc oxide.

3. The label of claim 1, wherein the first primer is in contact with at least a portion of the facestock layer.

4. The label of claim 1, wherein the weight ratio of SIS to SB copolymers ranges from 4:1 to 0.25:1.

5. The label of claim 1, wherein both the first and second primer layers comprise zinc oxide.

6. The label of claim 1, wherein the first primer layer further comprises titanium dioxide.

7. The label of claim 1, wherein the first primer layer and the second primer layer comprise carbon and zinc oxide, and wherein the weight ratio of zinc oxide in the first primer to zinc oxide in the second primer ranges from 0.05:1 to 1:1.

8. The label of claim 1, wherein the first primer layer is essentially free of epoxy resin.

9. The label of claim 1, wherein the second primer layer is essentially free of titanium dioxide.

10. The label of claim 1, wherein the reactive adhesive layer is essentially free of zinc oxide.

11. The label of claim 1, wherein the first primer layer comprises:
   titanium oxide, zinc oxide, phenolic resin, and chlorinated rubber.

12. The label of claim 11, wherein the first primer layer comprises:
   from 12 to 20 wt % titanium dioxide;
   from 4 to 10 wt % carbon, and
   from 2 to 8 wt % zinc oxide, based on the weight of the first primer layer.

13. The label of claim 1, wherein the first primer layer comprises:
   from 4 to 40 wt % phenolic resin; and/or
   from 40 to 80 wt % chlorinated rubber, based on the weight of the first primer layer.

14. The label of claim 1, wherein the second primer layer comprises:
   zinc oxide, carbon, phenolic resin, chlorinated rubber, and bisphenol-A-epichlorthdrin epoxy resin.

15. The label of claim 1, wherein the second primer layer comprises:
   from 4 to 10 wt % carbon;
   from 4 to 12 wt % zinc oxide; and/or
   from 0.4 to 2 wt % epoxy resin based on the weight of the second primer layer.

16. The label of claim 1, wherein the second primer layer comprises:
from 0.4 to 2 wt %, bisphenol-A epichlorhydrin epoxy resin based on the weight of the second primer layer.

17. The label of claim 1, wherein the second primer layer comprises:
from 4 to 40 wt % phenolic resin; and
from 40 to 80 wt % chlorinated rubber based on the weight of the second primer layer.

18. The label of claim 1, wherein the epoxy resin has an average molecular weight that ranges from 100 to 700 g/mol.

19. The label of claim 1, wherein the facestock layer has a thickness ranging from 100 microns to 1000 microns.

20. The label of claim 1, wherein the facestock layer is receptive to thermal transfer printing.

21. The label of claim 1, wherein the facestock layer further comprises a topcoat.

22. The label of claim 1, wherein the second primer layer has a coating weight ranging from 3 to 15 gsm.

23. The label of claim 1, where in the first primer layer has a coating weight ranging from 1-8 gsm.

24. The label of claim 1, wherein the coating weight ratio of the first primer to the second primer ranges from 0.2:1 to 2:1.

25. The label of claim 1, further comprising a liner.

26. The label of claim 25, wherein the liner has a thickness ranging from 20 to 150 micron.

27. The label of claim 1, wherein the curing agent comprises a phenolic derivative and is essentially free of sulfur.

28. The label of claim 27, wherein the phenolic derivative comprises bromized phenol formaldehyde.

29. The label of claim 1, wherein the amount of SIS copolymer ranges from 10 to 50 wt % based on the total weight of the adhesive.

30. The label of claim 1, wherein the amount of SB copolymer ranges from 10 to 50 wt % based on the total weight of the adhesive.

31. The label of claim 1, wherein the weight ratio of tackifiers to combined copolymers ranges from 0.11:1 to 4:1.

32. The label of claim 1, wherein the amount of rosin resin in the adhesive ranges from 0 to 50 wt % based on the total weight of the adhesive.

33. The label of claim 1, wherein the amount of hydrocarbon resin in the adhesive ranges from 0 to 50 wt % based on the total weight of the adhesive.

34. The label of claim 1, wherein the adhesive has a coating weight that ranges from 10 gsm-80 gsm.

35. The label of claim 1, wherein the label demonstrates a 180° C. peel strength of that ranges from 15 to 25 N/inch on stainless steel.

36. The label of claim 1, wherein the label demonstrates a 180° C. peel strength that ranges from 3 to 10 N/inch on green rubber.

37. The label of claim 1, wherein the label demonstrates a 180° C. peel strength that is greater than 50 N/inch on stainless steel after vulcanization at 160° C. for 10 min or vulcanization at 180° C. for 20 min.

38. The label of claim 1, wherein the label demonstrates a 180° C. peel strength that is greater than 200 N/inch on green rubber after vulcanization at 160° C. for 10 min or vulcanization at 180° C. for 20 min.

39. A method of labeling a tire, comprising attaching the label of claim 1 to a tire.

40. The method of claim 39, wherein the tire with the label attached is vulcanized at a temperature ranging from 150° C. to 200° C. for 10-20 min and under the pressure of at least 1 MPa.

41. A label comprising:
a facestock layer;
a primer layer; and
a reactive adhesive layer comprising:
a first rubber comprising a styrene-isoprene-styrene ("SIS") copolymer, and
a second rubber comprising a styrene-butadiene ("SB") copolymer,
a tackifier comprising a compound selected from the group consisting of a hydrocarbon resin, a rosin resin, and mixtures thereof; and
a curing agent comprising a phenolic resin.

42. The label of claim 41, wherein the label comprises two primer layers and the two primer layers have different compositions and wherein at least one of the first and second primer layers has a coating weight that is greater than 3 gsm.

43. A method of producing a label, comprising
a) providing a first primer solution comprising components dispersed in a first complex solvent, and a second primer solution comprising zinc oxide dispersed in a second complex solvent, wherein the first and second primer solution have different compositions,
b) coating the first primer solution on a facestock layer to form a film/first primer complex,
c) drying the first primer/film complex,
d) coating the second primer solution on the first primer in the film/first primer complex to form a film/first primer/second primer complex, and
e) drying the film/first primer/second primer complex.

44. A method of claim 43, wherein the components in the first primer solution comprise titanium oxide, zinc oxide, phenolic resin, chlorinated rubber, and/or carbon.

45. A method of claim 43, wherein the second primer solution further comprises phenolic resin, chlorinated rubber, epoxy resin and/or carbon.

46. The method of claim 43, wherein step (b) and/or step (d) is performed by gravure coating.

47. The method of claim 43, wherein the first complex solvent is selected from the group consisting of xylene, methyl pentanone, and mixtures thereof.

48. The method of claim 43, wherein the second complex solvent is selected from the group consisting of xylene, ethyl benzene, isopropyl alcohol, and mixtures thereof.

49. The method of claim 43, further comprising laminating the dried film/first primer/second primer complex with a reactive adhesive layer.

50. The method of claim 49, wherein the adhesive layer is coated with on a liner before being laminated with the dried film/first primer/second primer complex.

* * * * *